US009037388B2

(12) United States Patent
McCrary

(10) Patent No.: US 9,037,388 B2
(45) Date of Patent: May 19, 2015

(54) INTELLIGENT PUBLIC TRANSIT SYSTEM USING DUAL-MODE VEHICLES

(75) Inventor: Homer T. McCrary, Davenport, CA (US)

(73) Assignee: McCrary Personal Transport System, LLC, Davenport, CA (US)

( * ) Notice: Subject to any disclaimer, the term of this patent is extended or adjusted under 35 U.S.C. 154(b) by 1868 days.

(21) Appl. No.: 11/560,981

(22) Filed: Nov. 17, 2006

(65) Prior Publication Data

US 2008/0119965 A1    May 22, 2008

(51) Int. Cl.
G08G 1/16    (2006.01)
E01C 9/02    (2006.01)
B60C 7/00    (2006.01)
B60C 13/00   (2006.01)
G06Q 10/06   (2012.01)
G06Q 30/00   (2012.01)

(52) U.S. Cl.
CPC ... *E01C 9/02* (2013.01); *B60C 7/00* (2013.01); *B60C 13/001* (2013.04); *G06Q 10/0637* (2013.01); *G06Q 30/016* (2013.01)

(58) Field of Classification Search
USPC ........... 701/1, 2, 19, 117, 118, 119, 120, 121, 701/122; 340/933, 934, 935, 936, 938, 939
See application file for complete search history.

(56) References Cited

U.S. PATENT DOCUMENTS

| | | | | | |
|---|---|---|---|---|---|
| 3,587,470 | A | * | 6/1971 | Wilson | 104/299 |
| 3,613,599 | A | * | 10/1971 | Seidman | 104/8 |
| 3,895,584 | A | * | 7/1975 | Paddison | 104/88.03 |
| 5,473,233 | A | * | 12/1995 | Stull et al. | 318/587 |
| 5,845,583 | A | * | 12/1998 | Jensen | 105/72.2 |
| 5,928,294 | A | * | 7/1999 | Zelinkovsky | 701/24 |
| 6,320,515 | B1 | * | 11/2001 | Olsson | 340/905 |
| 6,668,729 | B1 | * | 12/2003 | Richards | 104/124 |
| 2002/0010974 | A1 | * | 1/2002 | McCrary | 14/77.1 |
| 2004/0011242 | A1 | * | 1/2004 | Roane | 105/72.2 |
| 2004/0054568 | A1 | * | 3/2004 | Bradley et al. | 705/7 |
| 2004/0225421 | A1 | * | 11/2004 | Wu | 701/19 |

\* cited by examiner

*Primary Examiner* — Stephen Holwerda
(74) *Attorney, Agent, or Firm* — Donald R Boys; Central Coast Patent Agency, Inc.

(57) ABSTRACT

A computerized system for guiding activity in a current construction project has digital memory storing information about completed and current construction projects, at least one input mechanism for a user to provide information to the digital memory concerning the current construction project, a processor system for accessing information in the digital memory, processing said information, and providing output available to a user of the computerized system, and software guiding the processor in its accessing information, processing the information, and in providing the output. Considering a current project, the software accesses information regarding one or more completed projects as well as information concerning the current project, processes the information, and provides output specifying one or more actions to be taken in the current project.

4 Claims, 20 Drawing Sheets

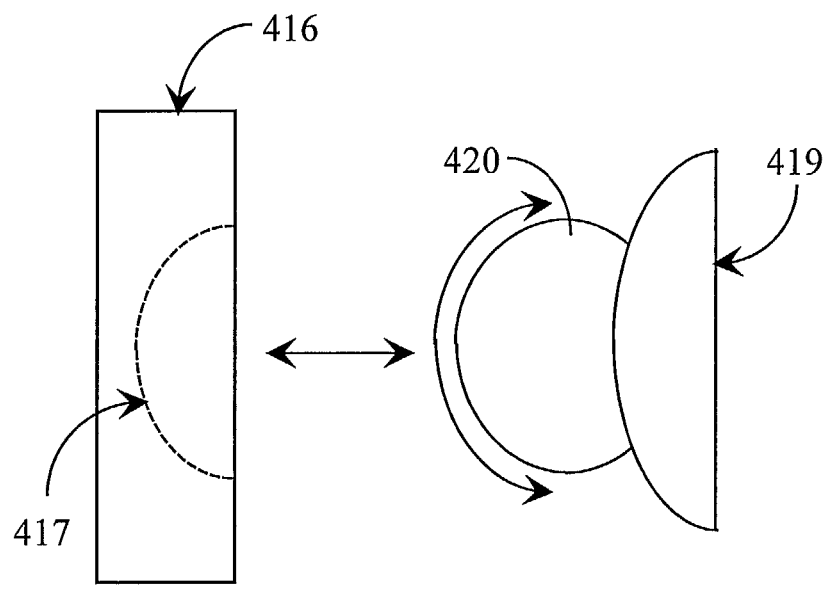
*Fig. 16a*          *Fig. 16b*
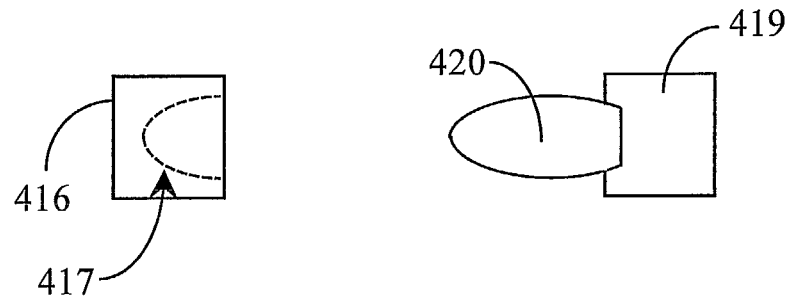
*Fig. 16c*          *Fig. 16d*

INTELLIGENT PUBLIC TRANSIT SYSTEM USING DUAL-MODE VEHICLES

FIELD OF THE INVENTION

The present Invention is in the field of mass transit and pertains more particularly to methods and apparatus for enabling an intelligent public transit system using dual-mode vehicles.

BACKGROUND OF THE INVENTION

As urbanized areas in major industrialized nations have become more congested in population, roadways, turnpikes, expressways, freeways, and the like have become more and more congested, and new ways of moving people have become more important. A good example of such congestion is in Southern California, particularly the Los Angeles area. Urban sprawl continues for many miles around Los Angeles, requiring ever more investment in highway infrastructure, which the relatively recent devastating earthquake in that area proves is a vulnerable investment.

These developments over many years have also prompted development and implementation of various mass transit schemes designed primarily for commuters who live and work in the area. Bus systems, train systems, and other rail-type mass transport systems are generally available for commuters in the more industrialized and modern areas.

There are also many congested urban areas around the world that are not modernized with respect to transportation. Often too few roadways are available in these areas. The roadways that are available are often congested to the point of gridlock. Lacking rail systems, commuter-lane freeways and other such infrastructure enjoyed in more modern urban areas, these poorer areas are disadvantaged, at least from the aspect of efficient transportation infrastructure, such that they may not contribute and develop economically, as they would be enabled to do if there were adequate transportation.

It has been generally believed that introducing more conventional forms of mass transit such as rail systems, more buses, trolleys, etc. could alleviate congestion problems on roadways and the like. To this end billions of dollars are devoted to more-or-less conventional mass transit systems. However, it has been found that in modern areas people more often prefer independent modes of travel, such as by automobile. Even when commuter lanes on freeways are available for private automobiles, it seems most commuters would rather go it alone than join a carpool or solicit others to form one. Moreover, rail systems and other common mass-transit modes are enormously expensive and must be generally supported through paying ridership by the public. When enough individuals cannot be solicited to patronize such a system, it may suffer from lack of maintenance, poor service, and in some instances, service may be discontinued altogether. The alternative of building more freeways to accommodate individual motorists is extremely expensive and takes up otherwise usable space.

In view of the above considerations, it is very desirable as public policy to provide an economically-feasible system of mass transit that also provides personal privacy and individual freedom to users of such a system. While there have been efforts to provide more personalization and individuality with respect to mass-transit modes, these systems are often prohibitively expensive, or do not provide enough individuality or personalization to attract large numbers of users, which, in the long run is self-defeating. Some of these prior art systems involve no more than providing improved communication between transit authorities and passengers, while others attempt to provide independent modes of travel on special roadways that are modified from existing roadways, or built new at extravagant costs.

One such prior art system is taught by U.S. Pat. No. 5,669,470, issued on Sep. 23, 1997 to Howard R. Ross, hereinafter referred to as Ross. Ross provides an electrically-powered vehicle with on-board batteries adapted to ride on a special designated roadway adapted to inductively distribute electrical energy to each vehicle. While this system may alleviate some traffic on normal roadways and provide for individually personalized transportation, either normal roadways must be modified, or new roadways must be constructed to facilitate such electrically powered vehicles.

Breaking up existing roadways is extremely expensive as is building new roadways. Moreover, with many roadways already widened to support special commuter lanes, it is doubtful that adding lanes for electric vehicles would be practical even if the expense could be met.

Another prior art system, U.S. Pat. No. 5,739,744 issued to Antonio Carlos Tambasco Olandesi, hereinafter referred to as Olandesi, simply provides computer capability to gas-powered buses in a transit capacity. Such capability affords drivers and passengers with acknowledge of scheduling information, current time status such as length of delays, scheduled arrivals, and so on. The onboard computer means communicates with terminals at stops along the route. However, passengers still must pack in as a group and do not have any individual control accept for boarding and disembarking, as with conventional bus systems.

Still other prior art systems provide individual vehicles adapted to ride on a rail-like above-ground structure. Almost invariably, such systems require rigid confinement of the vehicles to the rail-structure such that the vehicle is constrained to ride on a special rail or in a special groove. No dual mobility is afforded with these rail systems which is a common constraint seen with many prior art aboveground rail systems.

It is desirable in view of the above limitations associated with the state of the art to provide a transit system that provides a passenger with all of the privacy of driving a personal vehicle, while also enabling the passenger to enjoy a worry-free commute void of any requirement to navigate the vehicle. It is further desirable to provide such a system relatively inexpensively and with infrastructure that is modular in nature and may be quickly assembled or taken down without taxing precious land resource or significantly disturbing the environment.

One prior art system that provides a relative few of the desired characteristics described above is taught by U.S. Pat. No. 5,473,233 issued on Dec. 5, 1995 to Mark A. Stull and George F. Dippel, hereinafter referred to as Stull et al. Stull et al. teaches a mass transit system that uses a special roadway whereon a vehicle is driven via electromagnetic power provided by an electric utility and special electromagnetic elements or coils implanted at short intervals along the roadway. The implanted elements communicate with magnetic apparatus (large magnets) installed in each vehicle. The vehicles are urged forward by an electromagnetic current distributed at various modulations to control the speed of each vehicle.

Each vehicle in the Stull et al. system may operate in dual mode in the sense that when not on the special roadway whereon electromagnetic propulsion is the only option, it may be operated as an electric vehicle capable of self-propulsion on a typical surface roadway. Each vehicle is adapted to carry only a few passengers, a constraint necessary due to the mode of travel.

One problem with this system is that it relies on a special roadway that must be modified from an existing roadway, or created new. As described above, tearing up existing roadway to embed special surfaces and electromagnetic modules is prohibitively expensive. Such a dedicated roadway or guideway also requires many entrance and exit ramps of sufficient length to accommodate acceleration to an optimum speed of travel, which may be up to 150 miles per hour according to Stull. Similarly, the amount of electric current needed to provide power for the embedded coils limits the scope of Stull's system requiring, that it be implemented for short distances only such as in urban locales. This constraint limits the number and type of commuters that may benefit to those local commuters living within the city. Moreover, in areas where heat during the summer may cause unusual demand on electricity, the system appears vulnerable.

Even though the infrastructure of Stull et al. is prohibitively expensive and complex, a desirable feature is exhibited with respect to the vehicles. That is that each vehicle is equipped with an on-board computer means for communicating with a "computerized global system". Such communication capability includes diagnostic evaluations of vehicle integrity for traveling on the system, control of vehicle speed, and control of vehicle position as related to other vehicles traveling on the same guide-way. Unfortunately, the global system uses hardwired local control stations having a plurality of roadway modules that must be installed and operational for successful vehicle to system communication. Such wiring and distributed modules must be constantly maintained and tested which is an ongoing and considerable expense.

More importantly, vehicles traveling on the guide-way are not self-propelled. Rather, they are controlled as a group under a shared system of electromagnetic propulsion. This fact introduces an undesired complexity wherein the global system must communicate with each vehicle and the power source supplying the shared power. Based on each individual vehicle needs, the global system must regulate the electromagnetic system so as to supply the required power at the required location within a required time window such as when vehicles must be brought up to speed for entering the system. In fact, the electromagnetic system must be divided into two parts: one for the main guide-way, and one for the entrance and exit ramps. This kind of complexity is difficult to maintain even over short distances. Furthermore, the speed capability of Stull et al's system is disclosed as from 50 miles per hour to 150 miles per hour. While this capability may be impressive in a long, straight, commute, a short distance would never require such capability, and as Stull's vehicles are not constrained to the guide-way, an element of danger is exposed at higher speed levels.

As can be seen above, Stull et al, while able to provide some individual privacy for commuters by way of dual-mode vehicles, fails to provide a system that is economical and practical for more than short-range use. It is even dubious that a short-range system practicing under the concepts of Stull et al. could be implemented economically, especially in areas that are not particularly rich in resources. Much innovation is still needed to achieve the desired characteristics for a really successful mass transit system.

For a mass transit system to be economical in terms of infrastructure, it must be modular in nature, meaning that the roadway must be of such a construction that it may be installed in urban, suburban, and rural areas without adding to existing roadways or otherwise disturbing useful land areas extensively. For a mass transit system to be successful in terms of providing convenience and amenity to proposed commuters, it must be flexible in nature, conciliatory toward commuter preferences, and affordable for commuters. For a mass transit system to be successful in terms of social practicability, it must, along with the above, be aesthetically acceptable within the community and help to solve transportation problems existing within the community.

Another apparent difficulty with the mass transit systems described above as in and defining the state of the prior art, is that all are relatively mechanically complex. That is, they all require in some degree power distribution in the roadway, complicated mechanical switching, and the like. Complexity equals expense and unreliable operations.

Accordingly what is clearly needed is a mass transit system that is very simple, avoids mechanical complexity, can be personalized to commuters, and that may be implemented regionally and economically in terms of infrastructure. Such as system would allow people to commute en mass while retaining individual privacy as if driving their own vehicle from point of departure to point of arrival to a final destination. Such a system would also allow less developed areas to obtain badly needed infrastructure at a minimal investment, which would also attract other economic investment.

SUMMARY OF THE INVENTION

In an embodiment of the invention a computerized system for guiding activity in a current construction project is provided, comprising digital memory storing information about completed and current construction projects, at least one input mechanism for a user to provide information to the digital memory concerning the current construction project, a processor system for accessing information in the digital memory, processing said information, and providing output available to a user of the computerized system, and software guiding the processor in its accessing information, processing the information, and in providing the output. Considering a current project, the software accesses information regarding one or more completed projects as well as information concerning the current project, processes the information, and provides output specifying one or more actions to be taken in the current project.

In one embodiment the projects concern building computer-managed personal transport systems, wherein wheeled vehicles are guided in dedicated roadways. Also in one embodiment, during the current project, the user provides, at certain points in the project, input through the input mechanism concerning actual actions taken in the current project relative to actions output as to be taken, and also provides input regarding actual results of the actual actions taken. Also in one embodiment the processor is guided by the software to specify actions to cut costs, lower time frames, or to improve reliability or safety in the current project.

In another aspect of the invention a personal transport system is provided, comprising a master computer, a controlled roadway comprising travel lanes and entrance and exit ramps, and dual-mode wheeled vehicles each having an on-board computer coupled to the master computer system, the dual-mode vehicles capable of accessing the roadway via the entrance ramps, travel on the roadway, exiting the roadway via the exit ramps, and of being driven on surface streets. At individual entrance ramps, dual mode vehicles attempting to access an entrance ramp are evaluated by equipment coupled to the master computer for suitability to travel on the controlled roadway, and vehicles failing one or more tests may be prevented from accessing the controlled roadway.

In one embodiment of this transport system one of the suitability tests is operation of the vehicle over a course to determine ability to accelerate. Also in one embodiment individual entrance ramps have exit portals operable by the master computer, and vehicles failing one or more tests may be forced to exit via the exit portal. In still another embodiment evaluation includes determining whether or not a vehicle is equipped for control on the roadway, or whether or not a driver of a vehicle may be attempting to access the roadway with an unsuitable vehicle.

In another aspect of the invention a personal transport system is provided, comprising a master computer, a controlled roadway comprising travel lanes and entrance and exit ramps, dual-mode wheeled vehicles each having an on-board computer coupled to the master computer system, the dual-mode vehicles capable of accessing the roadway via the entrance ramps, travel on the roadway, exiting the roadway via the exit ramps, and of being driven on surface streets, and a communication facility allowing operators of the dual-mode vehicles to create and edit schedules for travel on the controlled roadway. The master computer system uses schedules entered by drivers to schedule and control operation of the controlled roadway, and reschedules and alters control according to edits made by the drivers.

In one embodiment of this invention edits may be made to a schedule by a driver at any time, including while traveling in a vehicle on the controlled roadway. In another embodiment an edit may include choosing an alternative exit while traveling in a vehicle on the controlled roadway.

In yet another aspect of the invention a personal transport system is provided, comprising a master computer, a controlled roadway comprising travel lanes and entrance and exit ramps, and dual-mode wheeled vehicles each having an on-board computer coupled to the master computer system, the dual-mode vehicles capable of accessing the roadway via the entrance ramps, travel on the roadway, exiting the roadway via the exit ramps, and of being driven on surface streets. The master computer system divides the roadway into virtual moving packets spaced apart by a specific distance, moving at a controlled speed, and vehicles are caused to occupy individual ones of the virtual packets, and wherein the master computer may adjust packet size and spacing during operation, causing vehicles occupying virtual spaces to readjust relative to one another according to the adjustment of the packets by the master computer.

In one embodiment the master computer adjusts virtual packets on a portion of the roadway ahead of an exit ramp to afford a vehicle about to exit additional space between that vehicle and proximate vehicles. In another embodiment the dual-mode vehicles comprise engagement mechanisms fore and aft, and wherein the master computer adjusts packet characteristics to cause two or more vehicles to engage one to another by the engagement mechanisms. In still another embodiment the adjustment is triggered by failure of one vehicle in operation, and by the engagement an immediately following vehicle is caused to push the failed vehicle.

In still another aspect of the invention a personal transport system is provided, comprising a master computer, a controlled roadway comprising travel lanes and entrance and exit ramps, and dual-mode wheeled vehicles each having an on-board computer coupled to the master computer system, the dual-mode vehicles capable of accessing the roadway via the entrance ramps, travel on the roadway, exiting the roadway via the exit ramps, and of being driven on surface streets. In this embodiment the master computer keeps a threaded history of operation, including problems and solutions.

In one embodiment, in the event of a current problem, the master computer consults the threaded history for similar problems in the past, to consider potential solutions to the current problem. Also in an embodiment, after consideration of solutions to similar past problems, the master computer outputs suggested procedures for correction. In still another embodiment past problems include problems related to environment conditions.

BRIEF DESCRIPTION OF THE DRAWING FIGURES

FIGS. 16*a* through 16*e* illustrate front and rear engagement bumper mechanisms and devices for use with vehicles in some embodiments of the invention.

Figure 17:
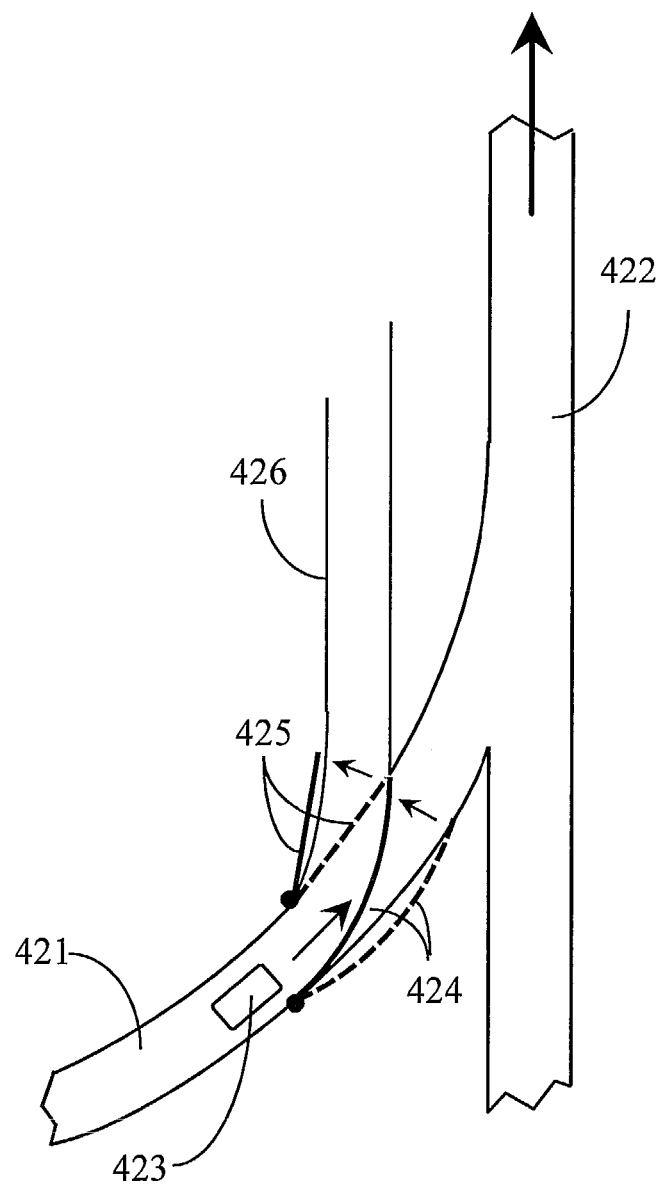

FIG. 17 is a plan view of one entrance ramp 421 onto a roadway 422 of the system in an embodiment of the invention.

Figure 18:
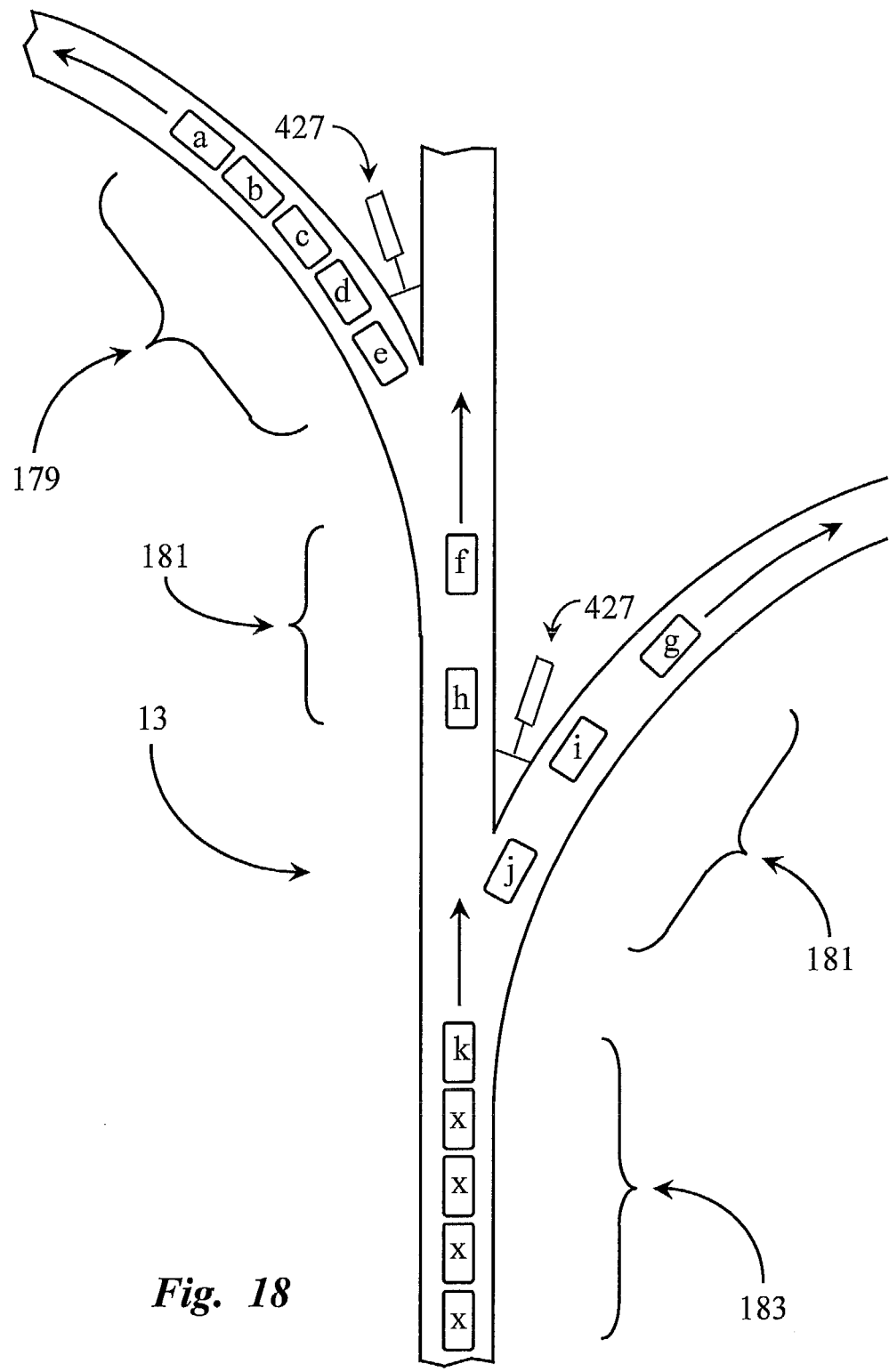

FIG. 18 is a plan view of a section of roadway showing two exit ramps, one to the right and one to the left, with some additional features in an embodiment of the invention.

DESCRIPTION OF THE PREFERRED EMBODIMENTS

According to a preferred embodiment of the present invention, a personal transportation system (PTS) is provided and implemented in a fashion such that much personalization is afforded to individual commuters. Personalization is achieved by providing self-propelled dual-mode personal vehicles (PVs) in which commuters may travel either on or off a unique controlled roadway system. Other facilitating systems and components thereof are provided as part of a unique overall personal transportation system (PTS). These include at least a modular infrastructure system that may be built up or taken down quickly and economically. Also, a Master computer system is provided for overall system management, diagnosing problems, and controlling aspects and performance of compatible vehicles. The Master computer system communicates with local stations of the controlled roadway and also with onboard computers in vehicles. In various implementations and embodiments of the system particular functions are assigned to different parts of the computer system. In a preferred embodiment the overall system is managed as a real-time continuing system wherein moving virtual positions, herein termed vehicle packets, for PVs in the system are constantly tracked, and recorded as occupied or available packets.

In various embodiments each PV is provided with individual proximity sensing systems which communicate both with an on-board computer (OBC) for the PV and in some instances with the Master computing system as well. The proximity sensor system in each PV is adapted to cooperate with the overall computer system to recognize PV positioning relative to other PVs and position on the controlled roadway, such as position integrity relative PV packets as introduced above, which are described in more detail below.

The proximity system in each PV reports to the OBC, which in turn reports to the Master computing system either directly or through local computerized stations. According to system parameters, the OBC systems control and adjust vehicle speed and steering while the PV is traveling on the controlled roadway. Proximity sensing between PVs moving on the controlled roadway provides a virtual coupling system, whereby PVs may behave as though coupled and moving in tandem. Additionally, in an alternative embodiment, a physical vehicle coupling system is provided and adapted to allow actual physical coupling or uncoupling of vehicles during operation on the controlled roadway.

Infrastructure

Figure 1:
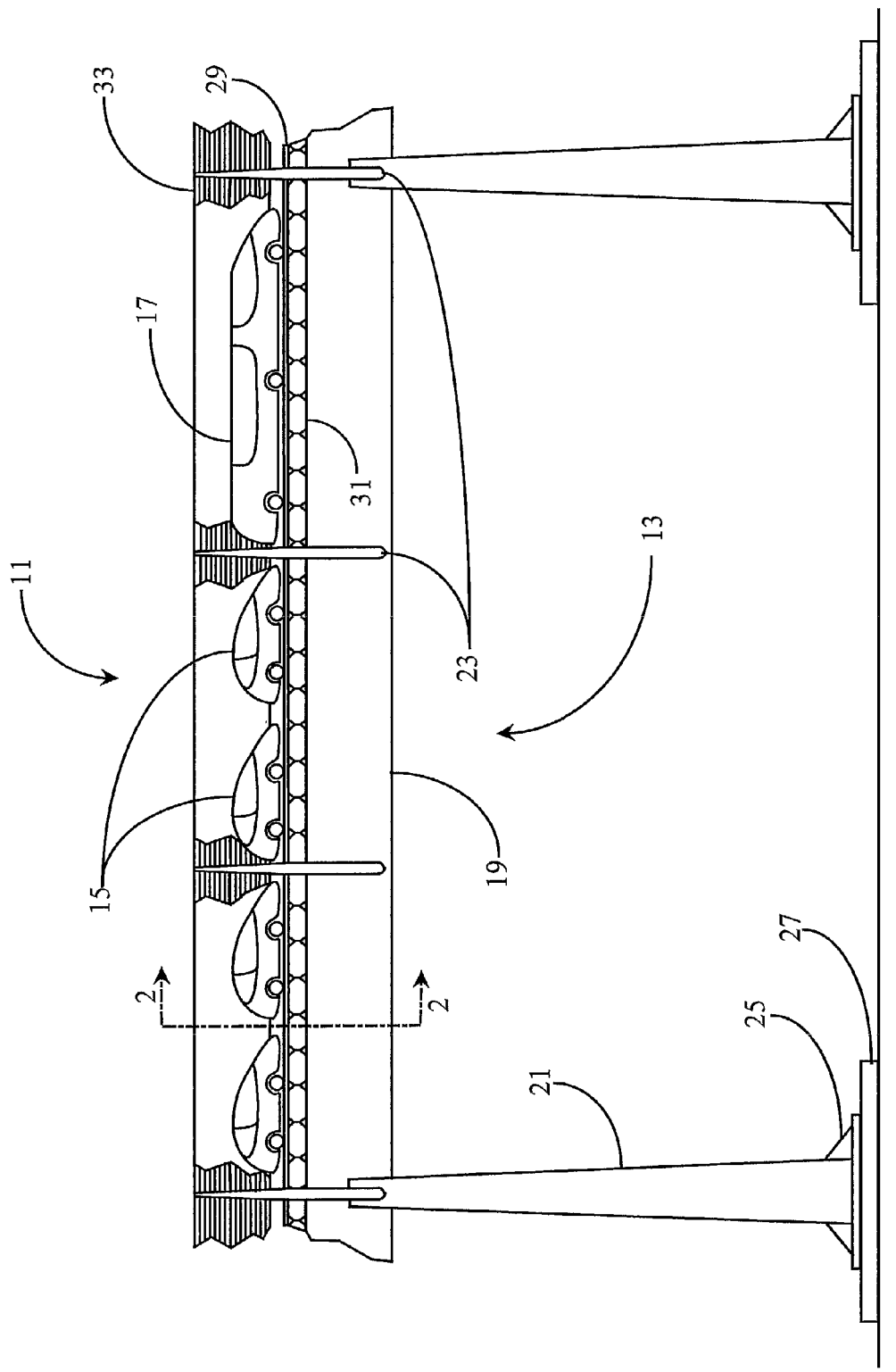
FIG. 1 is an elevation view of a section of elevated roadway with personal vehicles (PVs) commuting on a personalized transit system (PTS) according to an embodiment of the present invention.

FIG. 1 is an elevation view of a section 13 of a controlled roadway in an embodiment of the invention with personal vehicles (PVs) 15 traveling on a personalized transit system (PTS) 11 according to an embodiment of the present invention. PTS 11 utilizes an infrastructure composed in many embodiments at least primarily of elevated roadway, of which one section is seen in this view. In many embodiments at least some portions of the controlled roadway may be at surface level or below as well. Some portions of controlled roadway 13 are shown in broken section to show otherwise hidden components.

Roadway section 13 is supported by two substantially upright pillars 21 in this example, spaced apart a suitable distance over the length of controlled roadway to support individual sections, such as section 13. In this example, pillars 21 are conical, being circular in cross-section and tapered in shape from a base to a top end. In a preferred embodiment pillars 21 are manufactured from steel in a prefab fashion of standard lengths. In one embodiment, pillars 21 may be manufactured from steel and may take various shapes such as a tapered ribbed or finned pre-formed structure. In another embodiment, pillars 21 may be reinforced tubular structures having a welded outer skin of steel forming the tube portion of the structure. Suitable extension members (not shown) are also provided for attaining various lengths as may be required for implementation over uneven terrain. Such extension portions may be cut on-site if required to attain specific lengths as is known in the art of construction. It will be apparent to the skilled artisan that such support pillars may take many diverse forms.

Each pillar 21 in this embodiment has a steel pillar-support base 25 welded or otherwise rigidly affixed thereto. Support base 25 acts to stabilize pillar 21 such that it may be aligned and mounted by a method such as bolting to a concrete support pad 27. Support pad 27 is typically made level and anchored into the earth by known methods of earth-anchoring structures. Such support pillars provide a modular support for elevated sections of PTS 11, such that controlled roadway may be constructed over various surface terrains in virtually any surrounding environment. This type of elevated architecture may be implemented in urban, suburban, and rural areas without altering land and land use other than in the immediate vicinity of pads 27. In many places pre-existing right-of-way may be used, such as railroad access, existing roads having easements, canals, fireroads, and the like.

Roadway section 13 in this embodiment comprises a roadway support tube 19, a plurality of I-beam support members 31, and a roadway surface 29. Support tube 19 provides the base support for roadway 29. Tube 19 is centrally located beneath and parallel to road surfaces 29, which may indeed be multiple roadways. Tube 19 is preferably made of durable steel and is approximately 48 inches in diameter in this example, although many other sizes might be used. Support tube 19 has a wall thickness suitable for support and welding purposes. Tube 19 is structurally supported by a plurality of cross members 23 suitably spaced along roadway section 13. Cross members 23 are of steel and are welded or otherwise rigidly affixed to tube 19 and in appropriate junctions, pillars 21. Cross-members 23 act as a ribbing support, lending strength to roadway section 13 as well as providing support platforms from which other structure such as longitudinal walkways, side railings, and so on may be attatched. Such additional structures are not included in this view for the purpose of clarity as described above.

Roadway surfaces 29 are supported in an elevated position above support tube 19 by I-beams 31. Each roadway surface 29 is, in a preferred embodiment, at least partially a steel grating having openings therein for allowing snow and rain, and other debris, to fall through. I-beams 31 are welded or otherwise affixed on lower edges to tube 19 and on upper edges to roadway surface 29. In a preferred embodiment, all of the major infrastructure components of roadway section 13 are manufactured from durable steel much like material used in the construction of steel bridges and railway structures. This construction provides maximum strength and is relatively lightweight.

In a modular architecture such as the one provided herein, pillars 21 may be lowered into position by, for example, a helicopter after crews have completed construction of concrete pads 27. Sections of roadway 13 may be laid out along and between pillars 21 from already-constructed sections with the use of a wheeled and hydraulically operated support vehicle which will be described in enabling detail in a later section of this specification. By use of modular architecture and unique construction techniques taught herein, a dedicated route for PTS 11 may be constructed relatively swiftly and without significant disruption to the surrounding environment whether in an urban, suburban or rural area.

It should be apparent to one with skill in the art that there are many methods and a variety of known equipment that may be utilized to construct roadway section 13 of PTS 11 without departing from the spirit and scope of the present invention.

For example, in areas where abundant access roads are available and suitable for transporting heavy equipment, pillars 21 may be erected by more conventional methods. Helicopter placement would typically be used in areas where access roads are unavailable and terrain is generally adverse to more conventional construction techniques.

It will be apparent to the skilled artisan that not all support pillars, roadway sections, and peripheral equipment will be standard. There will, for example, be a need in some cases for curves in roadways to change direction, provision for elevation changes, and the like. The development of new PTS roadways will be an entirely separate enterprise from the operation of such systems, as described in this specification. It will also be apparent that computer programs may be created and used to provide parameters for bending and altering otherwise standard component structures for curves and elevation changes, and creating new components.

The creation of a new system, or an addition or replacement to an existing system must, of course, start with a plan. The inventor envisions the development of new and additional roadway systems to be a highly computerized process as well. A development computerized system will present interactive interfaces for developers to set up a project. A first phase simply establishes broad parameters, such as particular points in geography to be serviced. One might, for example, start a project in this system to provide a PTS loop from a furthest East point in San Jose, Calif. to a furthest West point in Santa Cruz, Calif., as a simple return loop, not at first establishing integration with any other such system. A team of developers might set up this project with the end points, and desired access points between the end points. There may be choices available for access points, as well. For example, some points may be only exit, and some only entrance, perhaps within relatively close proximity of one another, and some may have both entrance and exit capability.

In a first phase the new-system-development computer system would take the entry information, and provide back to the developers parts lists detailing the number of support structures required, the number of standard-length roadway sections required, the number of exit sections, the number of entrance sections, a plan-view layout of the system showing curves, layout, etc., and much other information, which might include cost runs for materials and parts, and even labor estimates. All of this can help the developers in planning and promoting.

After a first design phase, the development system would solicit more detailed information from the developers, having to do with specific locations for supports, entrance, exit ramps and the like. Some of this information may be provided through aerial photography, some by old-fashioned survey techniques, and more by mining known databases of topography and geography.

The feedback from the system to the developers in the second phase identifies specific problems and special requirements, and factors in workload and costs, providing the developers with additional information to promote the project.

In a third phase, the development system, assuming approval of the project, analyzes the requirements for start and finish, and the like, and provides a step-by step plan, perhaps with GANT charts, for carrying out the project. At frequent milestones a procedure is provided for the manager/developers to input actual progress and costs, to be used by the system to compare with original estimates and to update progress reports.

In one aspect this new computer system educates itself from one project to another, taking into account deviations and problems, and improving its own procedures for a next project. Historical data will be very valuable in developing the development of the PTS projects.

The inventor has discovered that a project system as described above has further application than just in PTS projects, and might be utilized by civil engineers and architects to manage a great variety of projects.

In another aspect a computerized system for development as described just above might also have features for dealing with deteriorated or damaged superstructure in existing PTS systems. Once the details of damage or deterioration, including for example, exact location, are known and entered, the system can specify a parts list for repair and renovation, plan the procedures necessary, and direct the phases of the project to accomplish the desired end.

PVs 15 are provided in embodiments of the invention as dual-mode vehicles that are, in a preferred embodiment, self-powered and equipped with suitable human interface and controls such that they may be operated manually on conventional streets and highways. In many embodiments the PVs are electrical vehicles (EVs) operating on rechargeable battery packs. In some embodiments the PVs may be hybrid vehicles having both internal combustion power plants and electrical power plants.

When traveling on PTS 11, over controlled roadway as shown, the vehicles are controlled individually by the system such that manual operation is not required. Rather, the vehicles are centrally controlled by the previously-introduced Master computer system (not shown in this drawing), or by subordinate computer stations in conjunction with the previously-described OBC systems. In this way, commuters may relax and enjoy a worry-free commute while on PTS 11. Manual operation of PVs 15 is resumed after commuters disembark from PTS 11, to enable the commuters to continue on to their ultimate destinations over surface streets and roads.

In some embodiments lane separation barriers 33 (partially shown) are provided to act as dividing and enclosing barriers between PVs traveling on dual lanes and between PVs and the outer peripheral edges of roadway section 13. If PTS 11 has two PV lanes, for example such as one in each direction, then three barriers 33 might be used. One may be used as a center divider, and two as outer barriers for roadway section 13. Outer barriers 33 also provide protection against wind and wind-blown debris. Barriers 33 are preferably constructed from suitable steel, but may also be constructed from other materials such as aluminum, or even from transparent material to allow a view of the countryside for commuters.

A PV 17 is illustrated in FIG. 1 to provide an example of a multi-passenger vehicle that may, in alternative embodiments, be used instead of or in addition to smaller personal PVs 15. PV 17 is also self-powered such that operating on conventional surface roadways is possible as described above with PVs 15. Similarly, control of PVs 17 is transferred to a central computing means once entering the controlled roadway.

FIG. 2 is a cross-section of roadway section 13 of FIG. 1 taken along section line 2-2 of FIG. 1, illustrating cross-member 23 and other components in additional detail. The architecture of roadway section 13 as seen in this view is of an inverted triangular shape with a relatively low profile and less mass than a traditional rectangular structure. This novel design aids in the overall strength of the infrastructure, especially providing resistance against high winds.

Cross-member 23 has, in this example has a number of through-openings, such as openings 47 and 45 for the purpose making the structure lighter in weight. In alternative embodiments more of fewer such holes may be used, or none at all.

Cross-member 23 encompasses and is attached to primary longitudinal tubing 19 which supports all of the elements of the roadway section. Lateral girders 31 rest across tubing 19 as well, at spaced intervals along the roadway, not necessarily just at the position of the cross-members. Surface 29 of expanded metal provide a grid of openings as described above, such that water, snow and debris may fall through rather than building up on the roadway. Raised tracks 46 are provided, spaced apart the width of tires on the PVs, to engage the PV tires on the roadway.

In this example, there are two lanes shown for transportation with PV's 15. The PVs are shown with little detail, but it may be assumed the two-lanes are for travel in opposite direction. In addition to optional barriers 33 (one center barrier, and two outer barriers), a rigid center divider 34 is provided in this dual-lane example. Divider 34 is adapted as a protective barrier between the two illustrated travel lanes, and also, in this embodiment as a guide to front wheels of PVs 15, to guide the PVs on the controlled roadway. Retainer walls 43 are provided and adapted as protective barriers between lanes and provided outer pedestrian-walkways 39. Such rigid barriers are constructed from a suitable material such as steel that is strong enough to repel debris in the event of an accident. In addition to center guide barrier 34, outer guide barriers 36 are provided to additionally contain and guide PVs in operation.

In some preferred embodiments the tires for PVs are constructed to have a special low-friction sidewall material such as Teflon™ or other low friction material to reduce friction between the tires and side barriers and guide surfaces as much as possible. Also in some cases the side barrier surfaces may also be constructed to have low-friction material for the same reasons, and in some embodiments the tires are other than inflatable, to reduce the hazard of flat tires on the PTS roadway.

In some embodiments the surface of roadways may be impregnated or surfaced with very hard and wear-resistant materials, like tungsten carbide, for example. In some cases this extra wear resistance is added in manufacture before roadway sections are assembled into a continuing roadway, and may be added by deposition machines using high-energy systems, such as physical vapor deposition systems and sputtering systems. In some cases such materials may be added after a roadway is assembled. Systems may be put in place as well to periodically test and to monitor the condition of the surfaced or impregnated roadway, so that maintenance may be activated to resurface the roadway periodically.

In this embodiment guide barriers 34 and 36 have sloping faces toward the PV tracks, the sloping faces extending essentially to the outer edge of each raised track 46. In this manner, a V traveling along tracks 46 will have its front wheels guided by the guide barriers in addition to other guide apparatus and methods described below.

Pedestrian walkways 39 are shown in FIG. 2, but are not strictly required. Such walkways may be provided in some embodiments and not in others. Such structures may provide emergency access and for maintenance personnel to access certain areas of infrastructure. In the case of walkway structures such as walkways 39, suitable step-down structures such as step-down 41 may be provided for access to the interior portion of roadway 13.

In some embodiments emergency telephones may be provided at suitable intervals along walkways 39 for reporting any problems with the system such as debris damage, medical requirements, security problems, and so on. Such phone systems are expected to be used by maintenance personnel, rather than for any use by persons traveling in vehicles on the roadway.

In addition to walkways 39, emergency stop lanes (not shown) may be provided for PV's 15 along any length of roadway 13 in case of a detected performance problem or passenger-communicated emergency. In the case of vehicle stop lanes, certain sections of PTS 11 would, of course, be wide enough to support such additional infrastructure including additional support pillars and so on.

In some embodiments of the present invention tube 19 may have additional uses. One such use is as a communication wave-guide, for communication between different sub-systems. Also, access openings may be provided in tube structure 19 to enable a special maintenance vehicle to travel inside the tube to a problem location where suitable personnel access is similarly provided to roadway 13. The openings may be provided in suitable surface locations of tube 19 that provide for simple access to a target roadway section such as section 13. In this case, tube 19 may have a larger diameter enabling enough room for such a vehicle and personnel for travel. An enclosed stair-type or ladder style structure may be provided at each opening for insuring safety of personnel accessing a roadway section such as section 13. In still other embodiments tube 19 may be used for gas or liquid transport, and the like. Many such uses are possible.

In a preferred embodiment, the controlled roadway has raised tracks 46 adapted to provide a smooth surface for PV tires. In this case, there are two such raised tracks 46 placed longitudinally in each travel lane with one surface 46 proximate to and adapted to make contact with the left-side wheel arrangement, and the remaining surface 46 proximate to and adapted to make contact with the right-side wheel arrangement of each PV 15. As described above, the outer edges of the span of the raised tracks are proximate the angled surfaces of guide barriers 34 and 36 to form, in this embodiment at least, a physically-guided system for moving PVs.

In this particular example, there are two sets of proximity sensors 35a (left-set) and 35b (right set) mounted on each PV. Sensors 35a and 35b, depending on type, may sense walls of barriers 34 and 36, or may communicate with a plurality of cooperating proximity modules such as modules 37a and 37b. Modules such as modules 37a and 37b, where used, are located at the same height level as sensors 35a and 35b in a spaced-apart collinear arrangement along the length of barriers 34 and 36. The technology for proximity sensing may be radar, photoelectric, or other known methods, and cooperating modules may or may not be required, depending on the type of proximity sensors used. Information gathered by proximity sensors such as sensors 35a and 35b is utilized by PV on-board computers (OBCs not shown here) to guide automatic steering of PVs in addition to, or instead of the physical guiding afforded by barriers 34 and 36. A multi-passenger PV such as PV 17 of FIG. 1, if used, may have more than two sets of proximity sensors mounted to each side because of the significantly longer length. The operation of such sensors and cooperation with the OBCs and other elements of PVs is dealt with in further detail in sections of this specification below.

In one preferred embodiment, front and rear proximity sensors and modules (not shown) are provided on the front and rear of each PV. Continuous data defining the distance between successive vehicles as gathered by such sensors is utilized by OBC's of each PV to control speed of each PV according to an ideal and constant separation value, and to cooperate with the Master computer system in placing PVs, and maintaining their presence, in virtual PV packets as introduced above. This system will also be described in further detail below.

In another embodiment, front and rear sensors are not required because side proximity sensors may be utilized to provide PV speed and position relative to standard positions on the controlled roadway. Such information taken this way may be relayed to a local or Master computer station, analyzed, and then sent back to individual OBC's in respective vehicles as commands for speed adjustment requirements. In some embodiments PV-to-PV It will be apparent to one with skill in the art that actual structural features may be added or subtracted from roadway section 13 without departing from the spirit and scope of the present invention such as in the addition of stop lanes, access passageways, and so on. The inverted triangular design of cross-members 23 and their close proximate spacing provide ample means for adding additional structural features to the roadway.

In a preferred embodiment of the present invention, stations are provided at strategic locations along any given PTS route whether urban, suburban or rural. Each station is adapted to allow commuters to safely embark and disembark from PTS 11. An example of one such station is provided below.

Embarking and Disembarking Stations

Figure 3:
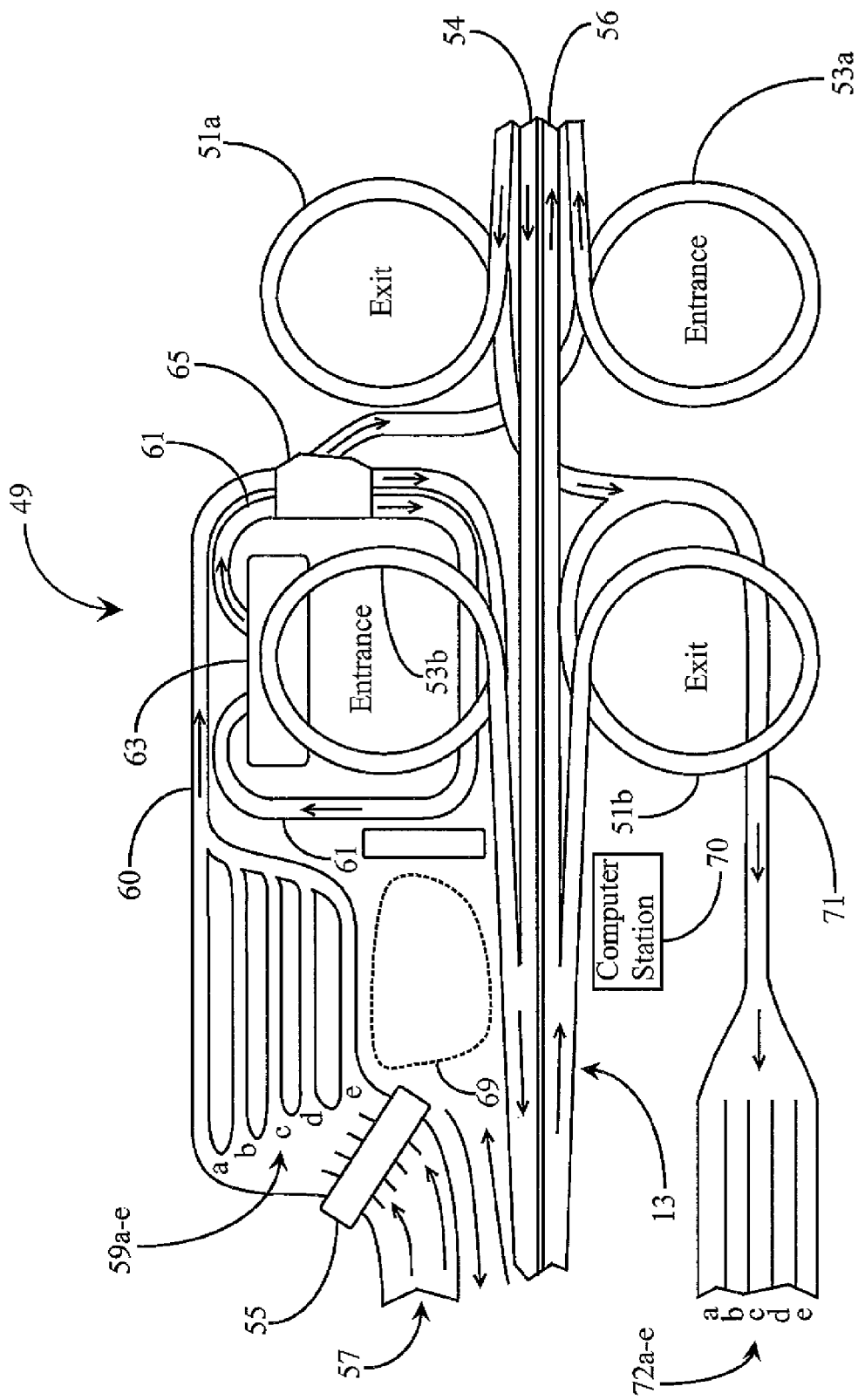
FIG. 3 is an overhead view of an embarking-disembarking station of a PTS system according to an embodiment of the present invention.

FIG. 3 is an exemplary overhead view of an embarking-disembarking station 49 of PTS 11 according to an embodiment of the present invention. Station 49 is exemplary of an embarking/disembarking point for commuters entering and exiting PTS 11. Station 49 may vary in architecture and functions as required to facilitate particular areas along PTS 11. For example, if station 49 is in an urban area, architecture and facilities will serve those needs. If station 49 is in a rural area, then architecture and facilities may be significantly less complex than shown in FIG. 3 in accordance to rural needs. It can be assumed that in this particular example, station 49 is a full-service station. Station 49 has a plurality of lanes dedicated to connecting commuters to various facilities, junctions to normal roadways, points of entrance, points of departure, and so on.

The controlled roadway, now defined as a connected plurality of previously-described elevated roadway sections 13, comprises two main traveling lanes 54 and 56 in this embodiment, one for each direction of travel on the PTS. Commuter travel in this example is bi-directional. In other instances, there may be fewer or more lanes as required to service an area or region. Lane 54 has an exit loop 51a located at the site of station 49 which is adapted to allow commuters to exit PTS 11 and to continue on surface roads and streets to nearby destination locations and so on. The intersection of lane 54 with exit lane 51a is actually off the figure to the right. Lane 54 also has an entrance loop 53b located at station 49 which is adapted to allow commuters to enter PTS 11 for remote destination points (typically other stations located near their ultimate destinations). Lane 56 has an exit loop 51b and an entrance loop 53a, which are adapted as described above with loops 51a and 53b.

Commuters wishing to enter PTS 11 may do so by first entering station 49 at a convenient staging location such as at entrance 57. Curved entrance arrows proximate to staging location 57 illustrate direction of travel into station 49. At this point each commuter is manually operating a PV such as PV 15 of FIG. 1. In some embodiments a PV diagnostic facility 55 is provided as an enclosed structure with through-lanes having bays adapted to perform various vehicle diagnostic routines and verification routines associated with commuter authorization to travel on PTS 11. In this example there are 5 lanes with each lane having one associated bay typically located inside the structure. Each bay is equipped with identical diagnostic and service facilities. Commuters simply drive their PVs into a lane and through an appropriate bay inside the enclosure, and a wireless communication connection s established between the appropriate bay and each PV OBC.

Diagnostic functions performed by a bay 55 may include but are not limited to checking PV batteries for integrity, checking tire pressure and wheel alignment, checking status and integrity of proximity sensors, testing OBC steering and speed control capabilities, testing OBC communication capabilities, and so on. Typically all of these functions are checked and monitored by each OBC for a PV, whether the PV is in a station or not. It is only really necessary that the OBC communicate the latest monitored information to the stations computer system, which is in constant communication with the Master computer system for the PTS.

Another important characteristic is weight of vehicles to be operated on the PTS. One reason this is important is that vehicles must be able to accelerate at a rate that provides for safe operation of a PTS roadway, such as to gain speed in a short span to match on entry with moving vehicles on the roadway. Another reason is that vehicles that are too heavy may pose a hazard for the roadway itself, and for peripheral equipment. Typically an upper weight limit must be enforced, because, even if the power of a vehicle is up to par, the ability of the vehicle to operate successfully and safely on the PTS roadway may be seriously affected by weight. It is the power-to-weight ratio that is critical. To be sure that vehicles are not too heavy, a weighing mechanism may be operable at a bay 55, or at other entry locations, similar in some respects to stations used in many states to weigh trucks. Ideally, vehicles will be pre-authorized to use the PTS, based on many characteristics as described in detail in this specification. This is not to say, however, that all vehicles will be exactly alike. There may some multi-passenger vehicles, such as vehicle 17 shown in FIG. 1 and described briefly above, as well as smaller personal vehicles, such as vehicles 15. Further, there may be other vehicles of different style and base (unloaded) weight that qualify to be operated on the PTS.

In some embodiments, where different sorts of vehicles may be used, the system may ascertain at bay 55 (or other location) by query to the OBC for example, the type of vehicle, and the system will know from the type what the base weight is supposed to be. In many embodiments vehicles are registered on the system, and a query to the OBC can determine all of the characteristics of the registered vehicle. Because these vehicles may be operated off the PTS on surface streets, and be used for various purposes, it stands to reason as well that users may carry luggage and other paraphernalia, and different people may load their vehicles differently. Still, all loose objects must be carried inside the vehicle. Therefore, the gross weight of the vehicle may not reliably be determined by the OBC, so a weigh station in conjunction with bay 55 is appropriate.

In some cases supplemental weigh stations may be employed at different places than before entrance ramps. Weighing stations may be built into certain sections of roadway on the PTS, for example, to double check the weight of vehicles traveling on the PTS, because any added weight may affect the ability of a vehicle to accelerate sufficiently to operate safely on the PTS.

Further to the above, although bay 55 is shown in FIG. 3 as having a relatively short dimension in the direction of travel of incoming vehicles, in some other embodiments the bay, or evaluation station, may have a considerable length, to be able, for example, to directly test the ability of a vehicle to accelerate sufficiently to operate safely on the PTS system. This ability to accelerate at a certain minimum level may be surmised from power and weight measurements, but to be absolutely sure a direct acceleration test may be desirable in some cases. In such a test each vehicle is checked to verify time and distance to come up to speed with a know weight, and results are recorded. Also, in some embodiments the Master Computer, and in some cases the OBCs in the vehicles may keep a comprehensive history of tests. Such a history might, for example, indicate a deteriorating ability to accelerate or brake or steer, and may therefore be useful in forecasting repair procedures and periods for individual vehicles.

By checking each vehicle as it comes into a station for access to the PTS, it is assured that no unstable vehicles are allowed to enter PTS 11. Verification of driver fitness and authorization may be done as well and may include, but is not limited to, verifying driver identification, verifying destination, securing payment for travel, checking driver alertness or medical status, security check for contraband, and so on.

In an alternative preferred embodiment of the present invention it is not necessary to encumber stations with the vehicle checks. Alternatively PVs and their OBCs are in constant wireless communication with the PTS Master computer system, and all PVs that might be eligible for travel on the PTS. In this system each PV is known to the Master computer system by a unique identifier, and each PV is constantly tracked, so all necessary information is known tot he Master system. In such a system, as is further described below, commuters may also communicate travel plans to the PTS system ahead of time, make payments and the like, and the Master system considers all PVs at all times, whether the PVS are in the PTS system or not. There are many advantages to this comprehensive system.

In a preferred embodiment of the present invention PVs travel on the controlled roadway under power only from their on-board potential energy sources, without power derived from the roadway. This provides for the least complicated architecture for the roadway itself. In this embodiment PVs are monitored and checked at entrance or at some near time prior to entrance for the energy state of the on-board potential energy source, such as a battery for an EV, against user-provided destination information. Adequate power capability with a safety margin is required for authorization to enter.

Medical checks may be made for commuters as well, such as intoxication tests, blood pressure or heart condition checks, history of phobias, and so on. For example, a driver with a phobia of bridges or heights may be advised not to travel on PTS 11. A person found to be inebriated might be banned from travel on PTS 11. High-risk individuals for heart attack or stroke may be advised before traveling and so on. Security checks may include checking for pets, explosives, weapons, or other common contraband. In a preferred embodiment, records are kept on the Master computer for any and all data important to function and safety for the PTS.

In station 49, after being cleared for entrance, commuters are directed to one of a plurality of staging lanes 59a-e. Staging lanes 59a-e are adapted to accept individual PVs destined for a same station or general destination location. In this way, a group of PVs comprising multiple PVs destined for a same location may be caused to travel in close proximity to one another such that they may exit together at a next common or destination station. This is preferred as a means for maximizing energy efficiency for travel on PTS 11. A traveling group of PVs may be construed simply as more than one PV. The number of PVs traveling in any one group will vary according to congestive status of PTS 11 as a whole. For example, at odd hours not associated with regular commuting times, single PVs may be allowed to enter PTS 11 and travel without being associated with a group.

Upon entrance to the station, after maintenance and other checks, manual control of PVs is passed over to computer control from PTS 11. Now individual OBC's associated with each PV are in constant communication with a local computer control station 70 that interfaces with a Master PTS computer system. According to information transmitted from local computer station 70 and destination parameters associated with each packet of PVs, individual groups of PVs are caused to embark to their destinations in unison maintaining a constant speed and spacing between each PV in the line. For example, local computer station 70 knows the positioning and time of arrival of any through-groups of PVs traveling on lanes 56 or 54. A command for one of lines 59a-e arrives at such timing when it is known that the line may enter its designated lane safely.

As a group from lanes 59a-e is released for entrance, it travels according to the directional arrow shown on lane 60 through a turnstile 65. Turnstile 65 is adapted to direct a group of PVs to an appropriate entrance lane for either lane 56 or 54 as illustrated by directional arrows. For example, if a group is designated for entrance to lane 56, then it enters lane 56 by way of entrance loop 53a and merges in with passing traffic at the appropriate and constant speed of travel on PTS 11. Similarly, if a group is designated to travel on lane 54, then turnstile 65 is switched to allow entrance to lane 54 by way of entrance loop 53b.

In one embodiment, one of lanes 59a-e is designated to accept PVs having problems or having unauthorized PVs or unfit drivers. When such a line reaches turnstile 65, it is directed or switched to an internal access loop 61 that is adapted to direct such vehicles into a maintenance facility 63 wherein problem resolution services may be performed. If successful problem resolution is reached, an approved PV may exit facility 63 on loop 61 and re-enter turnstile 65 where it may be integrated into an appropriate next group of PVs headed for a same destination.

If for some reason a problem cannot be resolved, an additional return lane (not shown) may be provided and adapted to return such PVs back to entrance location 57 where they may undergo additional diagnostics at station 55, or perhaps, be swapped with an approved PV from a fleet of such vehicles that may be kept at station 49. If a PV cannot be controlled by PTS 11 because of an OBC failure, then it may not be allowed to enter any of lanes 59a-e. In this case, it may be redirected from station 55 to a parking area or to building 63 via alternate lanes (not shown). In a simple alternative, PVs failing one or more entrance requirement receive an electronic report card detailing the reason for rejection, and a recommendation for correction for future attempts at use of a PTS, and are then switched off the system and back onto the surface streets. There are many variable possibilities.

PVs traveling on PTS 11 need not enter station 49 when exiting lanes 54 and 56. A suitable exit lane 71 is provided for all exiting PVs. For example, a line of PVs exiting from lane 54 will use exit loop 51a and access exit lane 71 at a suitable merge location. PVs exiting lane 56 use exit loop 51b and merge onto lane 71 at the same merge location. As PVs decelerate and merge onto lane 71, they are directed to one of lanes 72 a-e according to known ultimate destination locations obtained when they entered PTS 11 from another station. Lanes 72 a-e represent passageways to local streets or roadways or freeway access roads leading to appropriate ultimate destinations. While PVs are in lanes 72 a-e, manual operation for each PV is restored to the driver allowing the driver to assume control and to continue on to a final destination.

In one embodiment, a suitable parking structure represented by dotted area 69 may be provided with entrance and exit lanes for commuters who work within walking distance of station 49. Parking structure 69 may be as simple as an open parking lot, or as complex as a multi-story-parking garage. In the latter case, structure 69 may include facilities at each parking stall for re-charging PV batteries, in the case of EVs or hybrid vehicles for a return trip, or refueling for internal-combustion-powered PVs, and other apparatus such as overhead storage monorails for very efficient storage. In this way, commuters may return to a fully ready PV ready for a return commute, and PVs may be readily found as needed.

It will be apparent to one with skill in the art that a variety of lanes, facilities and other support architecture may be utilized in a station such as station 49 without departing from the spirit and scope of the present invention. For example, additional diagnostic and maintenance facilities may be provided for multi-passenger PVs such as PV 17 of FIG. 1. Also, though not shown in FIG. 3, curved acceleration and deceleration ramps may be of fishook design, such that centripetal force effects are maintained at a constant value as vehicles are caused to accelerate and decelerate.

In one embodiment, PVs such as PV 17 may be intermingled with PVs such as PV 15 for traveling in lines with perhaps the multi-passenger PV being the lead vehicle. In still another embodiment, PVs such as PV 15 of FIG. 1 are kept at station 49, and may be used by passengers who first park their gas powered vehicles in a designated area at a station such as station 49, and so on. In a preferred embodiment, however, PVs such as PV 15 of FIG. 1 are dual-mode vehicles either owned or leased by individual commuters. The purchase or lease of such vehicles may insure unlimited ridership on PTS 11 while infrequent commuters must use multi-passenger vehicles such as PV 17 of FIG. 1.

Figure 4:
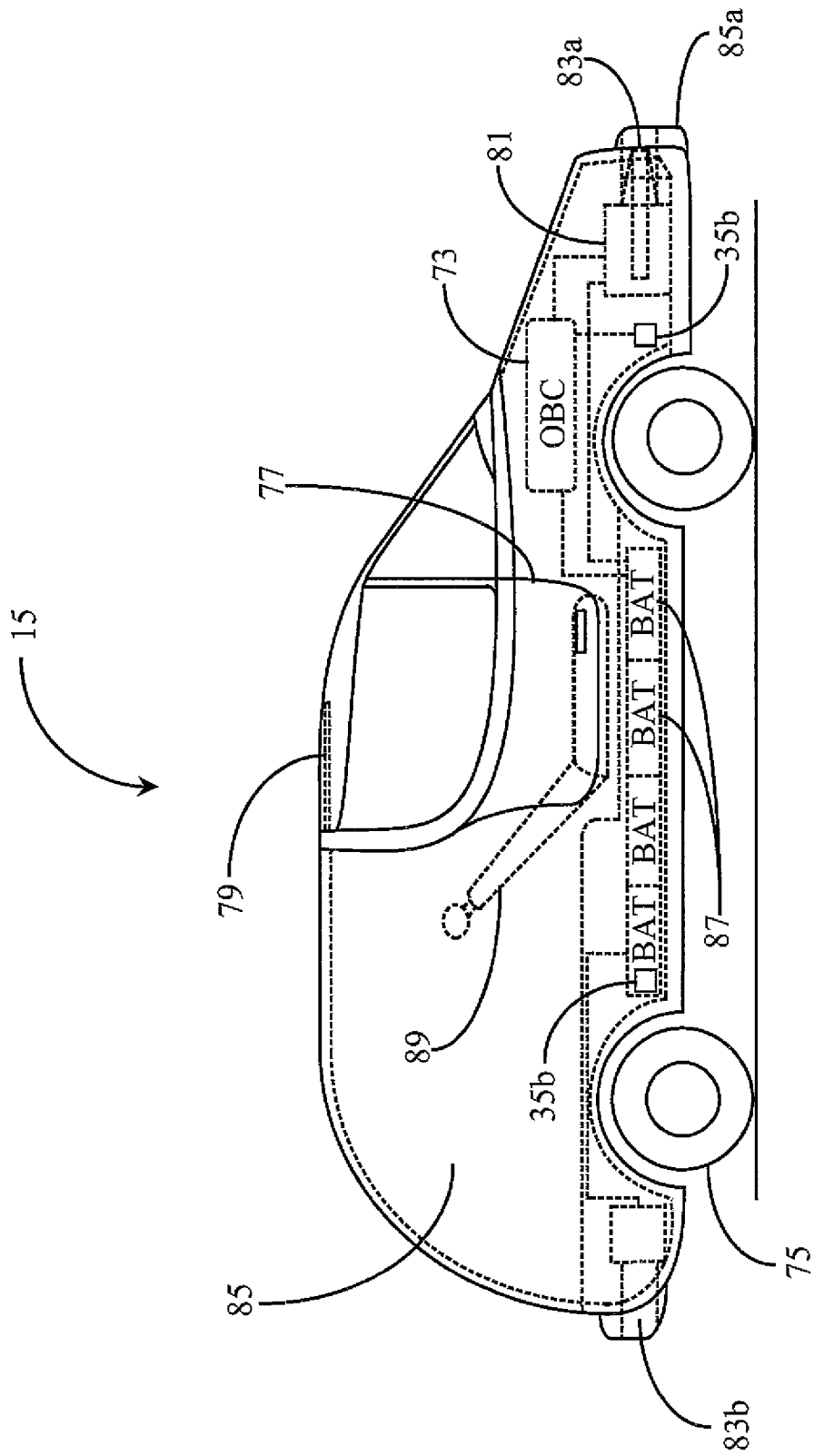
FIG. 4 is an elevation view of a PTS-compatible personal vehicle (PV) with an on-board computer (OBC) and other components according to an embodiment of the present invention.

FIG. 4 is an elevation view of a PV 15 of FIG. 1, implemented as an EV with an on board computer (OBC) 73 and other components according to an embodiment of the present invention. PV 15 is, as previously described, a dual-mode vehicle, meaning that it may travel in a self-propelled mode on surface streets under manual control by a driver, and on a controlled roadway of PTS 11 (FIG. 1), under control of its OBC and the computer system of the PTS.

PV 15 in this embodiment has an aerodynamically profiled body that is constructed from lightweight materials such as fiberglass and durable polymers. The aerodynamic profile of PV 15 as illustrated here is not to be construed as a limitation, as many differing designs may be used without departing from the spirit and scope of the present invention, such as those of standard compact vehicles, or new designs. The inventor intends to exemplify the profile of PV 15 as just one possible aerodynamic profile that may be compatible with PTS 11.

Frame components may be manufactured of durable metal such as steel. Other suitable materials known in the art may be used for the construction of PV 15 as long as they are durable and lightweight. PV 15 rides on wheels 75, which are, in preferred embodiments, rubberized tires mounted on suitable wheel rims as is known with standard automobiles.

Access doors 77 in this embodiment open in an upward manner similar to known gull-wing doors on some standard automobiles. A hinge area 79 is provided and adapted to facilitate gull-wing style doors 77. Doors 77 are used as a matter of convenience only. Sliding or conventional doors may be used instead. In barrier lanes where room is limited on either side of PV 15, gull wing or sliding doors may prove more practical.

A plurality of rechargeable batteries 87 (labeled BAT) make up the potential power source of PV 15 as an EV. All suitable battery types and sizes as known in the art may be considered for use. Batteries 87 are mounted inside PV 15 in a convenient and unobtrusive space such as under the floorboards, or in a provided compartment adapted for the purpose, as is known in existing EV designs. Batteries power one or more electric motors (not shown) used to drive axles to power wheels of PV 15. Batteries 87 also provide power for illumination systems such as head and taillights dash lights, turn signals and interior lights as well as communication and entertainment systems such as a CD stereo or audio system, and additionally OBC 73.

OBC 73 provides control over all on-board systems including but not limited to, proximity sensors such as sensors 35*a* and 35*b* of FIG. 2, speed control systems, steering control systems, and other components required to operate and guide PV 15. OBC 73 provides a number of functions, including a means for PV 15 to be operated by a Master computer system as communicated thereto either directly, or by a collaborating local computer station such as station 70 of FIG. 3.

PV 15 in this embodiment is typically designed to carry two individuals, a driver and a passenger. However, in some embodiments PV 15 may carry only one or perhaps up to four or more persons. A cargo area 85 is provided in this example for stowing briefcases, jackets, and other personal items that are typically carried by commuters. Bucket seats such as seat 89 are provided to be able to recline for driver and passenger relaxation during a commute on PTS 11. In alternative embodiments, bench seats may be provided.

In still another embodiment, a cargo area such as area 85 may be enlarged and the number of passengers restricted to one driver such as might be the case of a courier or delivery situation. It is also conceivable that while PV 15 is active on PTS 11 only cargo will be on board as a driver is not required to operate PV 15 when control is by computer system. There are many such possibilities.

As previously described, dual proximity sensors (35*b* illustrated here) communicate with lane barriers or embedded modules such as center divider 34, guide barriers 36 and side barriers 43 (see FIG. 2). Suitable control lines link sensors and other computer-controlled system components (not shown) to OBC 73.

In some embodiments a physical coupling system is provided and adapted to allow PVs such as PV 15 to be coupled and de-coupled while traveling on PTS 11 or at any other time. The coupling apparatus consists of a mechanized engaging member 83*a* illustrated as retracted within the front portion of PV 15 behind a front bumper 85*a*. A hydraulic system 81 in this embodiment is provided and adapted to enable the extension of member 83*a*. In other embodiments, other means of mechanization may be provided instead of hydraulic actuation.

At the rear portion of PV 15, a coupling receptacle 83*b* is provided and adapted to accept an extended engagement member such as member 83*a*. In this way, physical coupling can be achieved with multiple PVs in a line. A coupling system such as the one described above may be achieved in a variety of ways with varied mechanization schemes. A coupling system as described above is useful in a number of situations. Coupling with and towing a disabled PV, linking lines of PVs in case of a problem with the roadway. As previously described above, PVs such as PV 15 of FIG. 4 are controlled by a PTS computer system while traveling on PTS 11.

Figure 5:
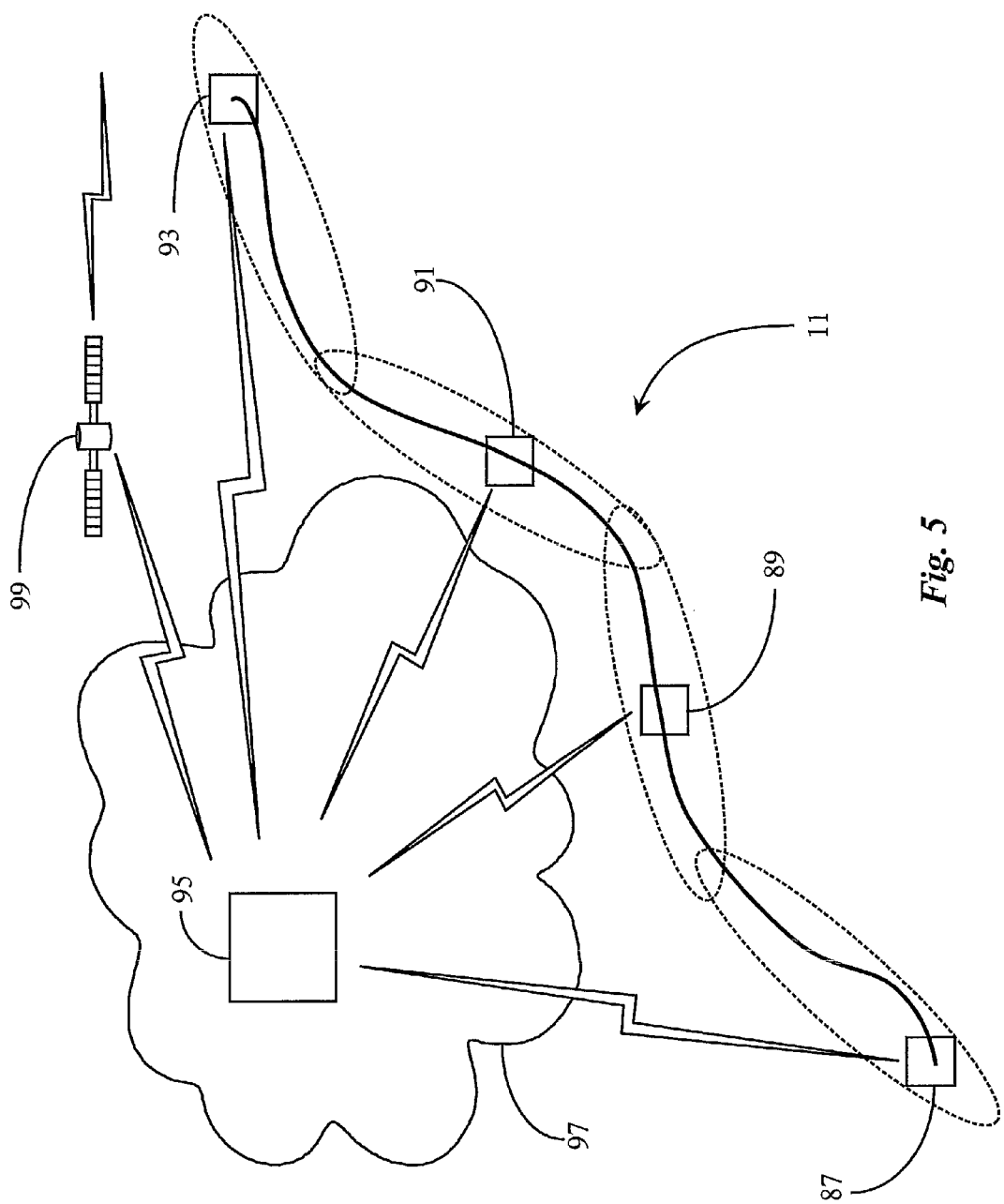
FIG. 5 is a general block diagram illustrating a PTS computer control network according to an embodiment of the present invention.

FIG. 5 is a block diagram illustrating a PTS computer-control system according to an embodiment of the present invention. The PTS control system comprises a Master computer system station 95, and a plurality of locally distributed computerized stations 87, 89, 91 and 93. In a preferred embodiment, the overall system uses a wireless digital mode of communication suitable for transmitting data using a high bandwidth. The wireless network is illustrated by network cloud 97. Computer stations 89 are, in many instances, located at access stations of PTS, but this is not a requirement or limitation in the invention.

Master computer station 95 may comprise a plurality of powerful connected computers or a single larger and more powerful computer capable of sending and receiving data between local stations 87-93 simultaneously, and of executing a tracking and operating system for PTS 11. Master station 95 keeps track of all activity occurring on PTS 11, and in some embodiments also keeps track of PVs off the PTS that are eligible to use PTS 11. Accounts are maintained as well for commuters subscribed to and authorized to use PTS 11, and the commuter's association with eligible PVs.

Current status for each local area or portion of PTS 11 is tracked and reported to Master station 95 by local computer stations 87-93 also referred to as slave stations. Slave stations 87-93 are analogous to computer station 70 of FIG. 3. It may be assumed that there is an embarking/disembarking station such as station 49 of FIG. 3 associated with each slave computer station, although this is not a requirement.

Each slave station 87-93 in this embodiment has an area of control associated with its immediate vicinity along PTS 11. Overlapping dotted ellipses represent these areas. Proximity sensor information from previously described modules, such as, for example, modules 37a and 37b (FIG. 2) distributed along the controlled roadway of PTS 11, report information to each local slave station. This information is continuously transmitted to Master station 95 enabling a complete real-time overview of traffic activity over the entire infrastructure of PTS 11.

As previously briefly described, the Master computer station envisions the overall dynamic system as moving virtual spaces (PV packets) on a continuous basis. The number of such moving spaces is a function of the size and capacity of the PTS. The Master system moves the virtual PV packets at a constant speed throughout the controlled roadway system, and knows at all times the position of each space. As spaces are manipulated in the system to traverse the system at a constant speed, the Master system can anticipate (forecast) the position of each space at any point in time.

Each PV packet moving in the system is logged by the Master system as occupied or not occupied by a PV at any instant in time. For example, the Master system forecasts a coming unoccupied space or group of spaces when a PV or packet of PVs is ready to enter the controlled roadway. The ready PV or packet is then controlled to coincide with the forecasted space or group of spaces, and at juncture, the virtual packets are logged by the system as occupied.

In response to logged and forecasted information (constantly checked and validated) main station 95 sends commands to individual OBC's either directly, or through associated slave stations. The commands to OBC's will mainly focus on cooperation with proximity sensing systems to orchestrate entry and exit to and from the PTS. A unique switching system and process is described below for switching PVs at junctions. Other commands and communication may include instructions for linking PVs together, informing passengers of current status in route, and so on.

In one embodiment, computer operators (not shown) are provided at station 95 as observers similar in some respects to air traffic controllers. Such operators may, in some instances, have override control capabilities that may be exerted in case of an emergency such as a failure on a portion of the system. As an example of such a situation, consider that a portion of PTS 11 in-between stations 89 and 93 has failed due to damage or excessive debris caused by a catastrophic weather event. Operators at station 95 would be able to cause all traffic to exit PTS 11 at stations 89 and at stations 93 whereupon such traffic may then travel on normal roadways to an undamaged area of PTS 11 and re-enter the system.

In one embodiment, a Master station such as station 95 may communicate and collaborate with a separate PTS system having a separate Master control station. This capability is illustrated in the embodiment by satellite 99 and associated communication icons. In this way, PVs may be advised prior to entering a PTS system such as system 11 that another nearby system has less traffic or wait time to enter.

Mobile-Aid Apparatus and Methods

One of the advantageous features in embodiments of the present invention is that all systems are kept as simple as possible. The controlled roadway, for example, has no apparatus for providing power to vehicles, or for charging vehicle batteries or refueling vehicles. There need not be, therefore, expensive and fragile electrical system integrated with the roadway. The roadway itself is a simple assembly of passive paths over which PVs may operate. Similarly there need not be elaborate switching systems because the vehicles not only travel under their own power, but also under their own steering systems.

In this philosophy each PV is expected to come onto a controlled roadway with more than adequate potential energy to complete a pre-determined trip. In the case of EVs, for example, the potential energy is the charge of the on-board batteries that power the PV. In the case of internal combustion power plants, the potential energy is the fuel load at the start of a trip. As described elsewhere in this specification, this means checks must be put in place to determine the potential energy resources of each PV entering the system.

The inventors recognize that there is a tradeoff in the simple philosophy adopted for embodiments of the present invention. To keep the roadway as simple as possible the range of PVs traveling on the roadway will be restricted, perhaps effecting overall applicability of the system. The inventors recognize as well, that the greatest impediment to forward travel for most vehicles, whether on a surface street or a controlled roadway such as proposed herein, is air friction. A great amount of energy is expended accelerating a vehicle to cruise speed, but once the speed is attained, the greater part of energy requirement is to maintain the speed against air resistance. Friction is a lesser retarding factor. Therefore, knowing that PVs traveling together in close proximity may create mutual draft, the total energy requirement for each V may be reduced by causing the PVs to travel in close proximity. There are also other ways the energy requirement may be reduced.

Figure 2A:
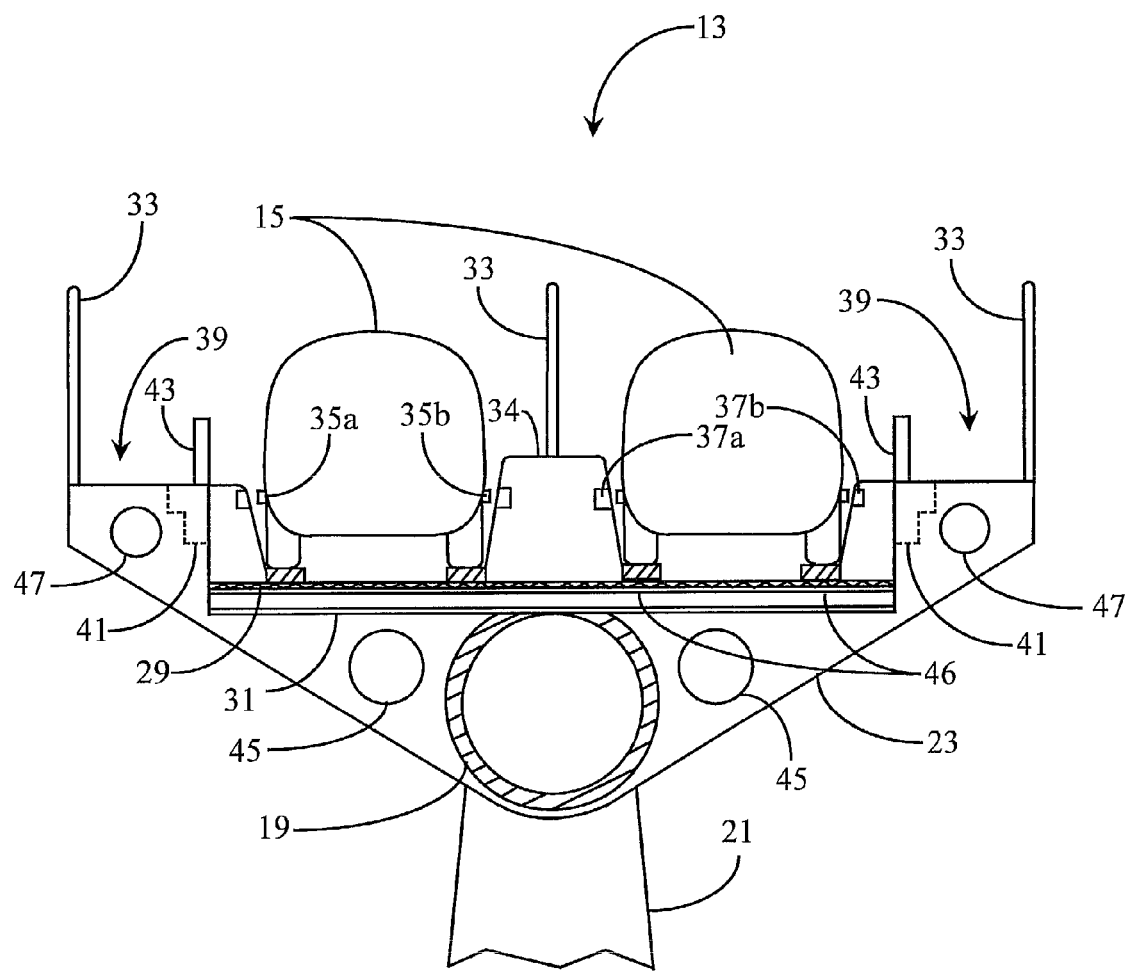
FIG. 2A is a cross-section of the elevated roadway of FIG. 1 taken along the sectioning lines 2-2 of FIG. 1.
Figure 2B:
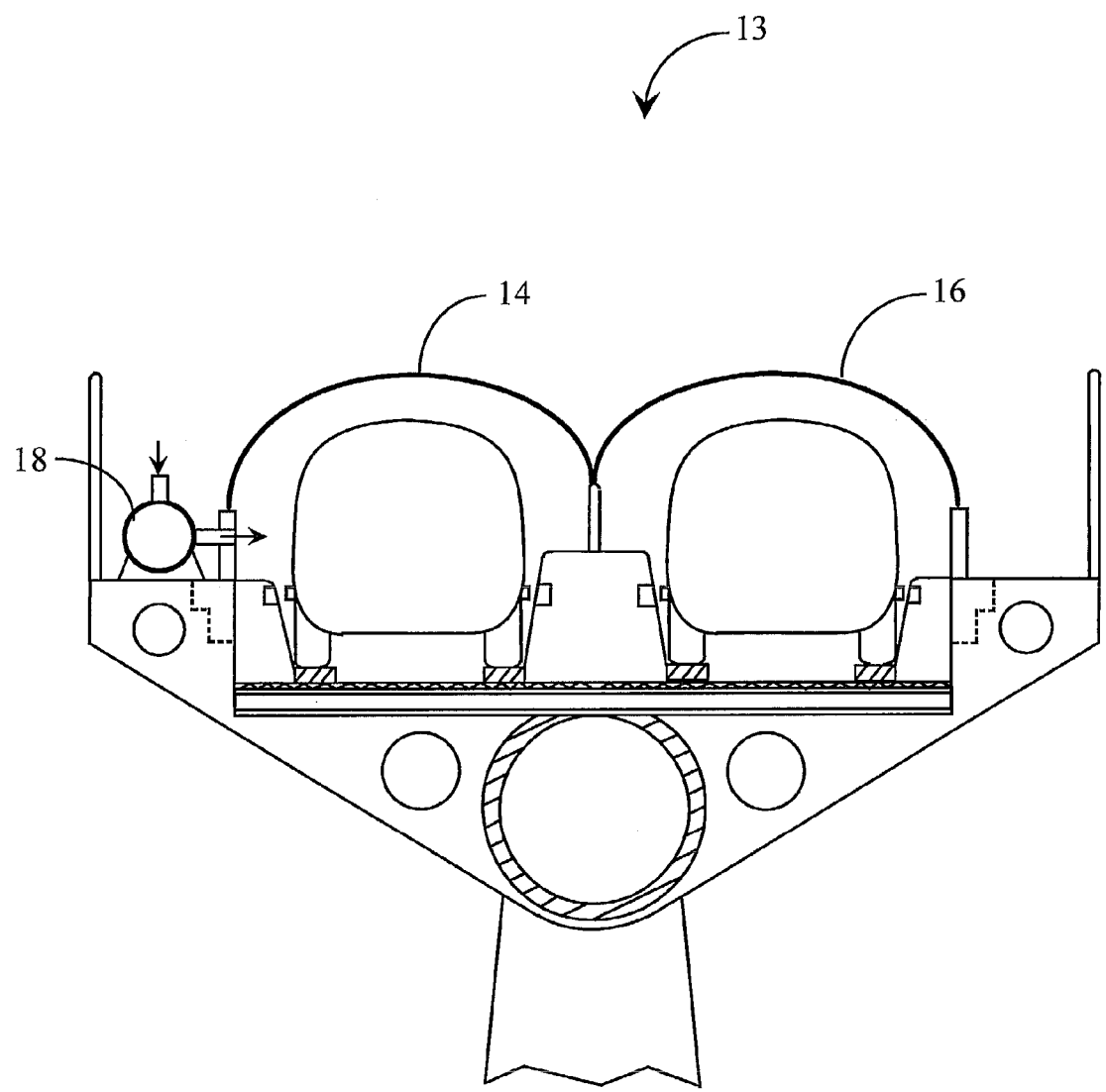
FIG. 2B is a cross-section of the elevated roadway of FIG. 1 taken along the sectioning lines 2-2 of FIG. 1 in an alternative embodiment.

FIG. 2B is a cross-section similar to that of FIG. 2A, showing coverings 14 and 16 over each oppositely directed lane. These coverings do not render the structure more complex, as they are also essentially passive, but provide in such embodiments several advantages. One is simply that rain, snow and sleet, and also unwanted debris, is kept off the controlled roadway. Another is that the air in each thus-created tube, will tend to keep moving in the direction of the travel of PVs and groups of PVs, thereby reducing the energy requirement for a PV to make a particular trip. Once the air is moving in one direction, it will tend to keep moving in that direction, and there will relatively less air friction for PVs traveling in the system.

In another embodiment air pumps (illustrated by element 18) are provided at intervals along the controlled roadway for the purpose of injecting air into the tube to move the body of air in the enclosed tubeway in the direction of the moving PVs, further reducing the potential energy requirement for each PV to make a trip. In alternative embodiments such air pumps may be mounted in different places, on the surface away from the structure, or within tube 19. A skilled artisan will understand that moving air may be applied in a variety of different ways. Also, air movement may be promoted by pumps providing partial vacuum as well as forced air.

Personal Vehicle

Referring again to FIG. 4 of this specification, PV 15 is described as a self-powered, dual-mode vehicle, which may be of a standard or new design. The embodiment of FIG. 4 shows PV 15 as a dual-mode electric vehicle (EV) with the term dual-mode referring to two methods of vehicle control (user control and system control). The power source for PV 15 as exemplified in FIG. 4 is rechargeable batteries.

In other aspects of the present invention, a potential power source for PV 15 other than electricity may be provided without departing from the spirit and scope of the present invention. Some other possible power sources include, but are not limited to, combustible liquid fuel, combustible dry fuel, solar-sourced electricity, or the like. Internal engine components would of course be compatible to the type of power source implemented. Dual-mode power sources are also possible. For example, PV 15 may use liquid fuel when traveling off of PTS 11 while using electricity when traveling on PTS 11. In another embodiment PV 15 runs on menthol fuel both on and off the PTS system. There are many alternative possibilities. The advantages of and features of the invention are not limited to one type of power for a PV.

PV 15 of FIG. 4 is approximately 10' long×5' wide in an exemplary embodiment. The dimensions cited are not to be construed as a limitation, but only as preferred size for obtaining an optimal "traffic load" on PTS 11 without sacrificing commuter comfort. Many differing designs may be used for PV 15 as previously described. In FIG. 4, the design is similar to a well-known mini-wagon. If a longer vehicle such as PV 17 of FIG. 1 is used, preferably, it is used in integration with compact passenger PVs such as PV 15.

In a preferred embodiment, the construction of each PV is standardized such that many different manufacturers may produce such vehicles in a competitive fashion, and all may be used on a PTS according to embodiments of the present invention. As a result, differing designs may be manufactured for PTS 11 as long as dimensional and functional requirements are met for traveling on the system.

Vehicle On-Board Computer (OBC)

Every PV such as PV 15 described above, is equipped with an OBC such as OBC 73 of FIG. 4. In a preferred embodiment, complete control of PV 15 may be transferred to PTS 11 while the vehicle is engaged on the controlled roadway of PTS 11. An exemplary OBC system is described in enabling detail below.

Figure 6:
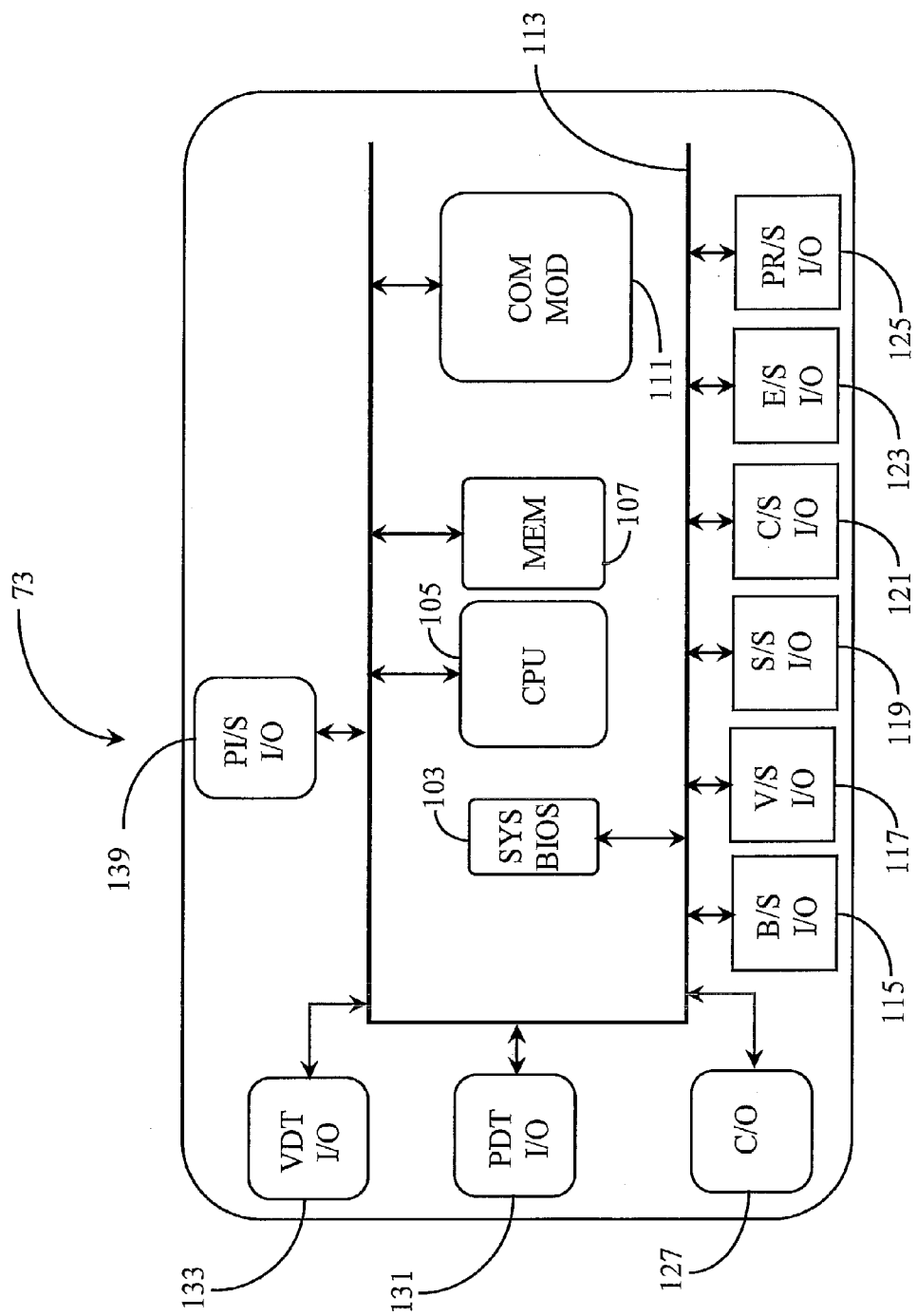
FIG. 6 is a block diagram of OBC 73 of FIG. 4 illustrating various required and optional components.

FIG. 6 is a block diagram of OBC 73 of FIG. 4 illustrating various required and optional components. OBC 73 is a relatively powerful and dedicated computer system for controlling various PV systems and communicating with main computer stations such as with previously described slave stations (FIG. 5, elements 87-89) and a Master station (FIG. 5, element 95), which oversees the entire PTS system. A preferred method of communication for OBC 73 is a high bandwidth-capable wireless data-packet network illustrated as network 97 of FIG. 5.

Each OBC such as OBC 73 has its own network address as is known in the art of wireless and other forms of network communication. Each address is a unique identifier, and also identifies the PV carrying the OBC. OBC 73 has a system bios 103, a CPU 105, and at least one suitable memory module 107. System bios 103 provides system boot capability and loads various required routines to CPU 105 and memory module 107. Such routines may include a pre-boot test of OBC components, operating system loading, and other known routines common with computer systems. CPU 105 has a processing speed suitable for the dedicated operations of OBC 73. CPU 105 must be fast enough to enable multi-tasked continual routines performed by OBC 73 such as steering, speed adjustment, proximity sensing and reporting, and the like. Recent developments in processing capability will provide processors with speeds up to 1000 MHz to be implemented in computer systems within a short time frame.

CPU 105 provides system commands in a multitasking environment such that many functions may be performed simultaneously as required during operation of PV 15. Memory module 107 holds software programs, such as a unique PTS operating system, temporary cached instructions, and other required data. Memory types may be any suitable mix of volatile and non-volatile memory including RAM, ROM, Flash memory, and so on.

In one embodiment, some memory may be provided in removable units such as a PC memory card. In this case, such cards may be removed from OBC 73 when not in use and plugged into a desk-top computer or other facility for the purpose of adding programming instruction, reporting status, upgrading functionality, and so on. In this way, certain instructions and intentions may be communicated to PTS 11 via a desktop computer with an Internet connection, or perhaps, via an accessible network-connected computer terminal adapted to communicate with such cards. Such a computer terminal may simply be located at an embarking location such as station 49 of FIG. 3, or alternatively, at any convenient public location such as an airport, job site, or other public locations. In this way, travel requests and the like may be pre-ordered and stored such that when PV 15 arrives at a station such as station 49 of FIG. 3, travel parameters and authorization parameters are already approved and only diagnostic functions related to mechanical integrity and the like need be performed.

In other embodiments the relationship between OBCs 73 for all PVs and the Master computer system is such that the Master maintains a real-time status on every PV qualified to use the controlled roadway(s) controlled by the Master system. In this architecture communication between Master system and OBCs is wireless through a leased or dedicated cell network, preferably of a data-packet nature. For this architecture OBCs for active PVs are preferably never turned off, but rather put into a sleep mode. The Master system may wake up any OBC within its communication range, and update data and functions with that OBC. In this architecture the Master system on a scheduled basis accesses records maintained by each OBC for each PV, and updates its own database as to, for example, suitability of a PV for authorization to enter a controlled roadway through an access station. More detail of the overall computer system nature for such an architecture is provided below.

In another aspect, also described in more detail below, not only is every PV through an OBC in frequent communication with the Master system, whether on a controlled roadway or not, but the Master, through an Internet site, also provides a WEB interface for commuters to interact using a desk-top computer, a laptop, or other Internet-capable appliance such as a personal organizer. In this system, also described in more detail below, a commuter may log a next day's access and travel plans for a controlled roadway on a previous evening, or in the morning before leaving for work or on another trip, by interfacing with a personalized WEB page maintained and managed by the Master computer system. Many other functions may be implemented via such WEB interaction as well, and, again, more detail is provided below in another section.

More on Preplanning and Scheduling

As described above, in a comprehensive system wherein a commuter can log into a web site managed by functions of the Master Computer system of the PTS system, and schedule access to the system at certain future times, there may well be a number of alternatives to be considered in such scheduling and planning. For example, in some cases the PTS will not be just a single-loop system, as is described in many examples of the present specification, but may be an interwoven and interrelated system of several loops and roadways. In one macro sense, the entire nation may have local and regional PTS systems, many or all related and interconnected, and managed by a large central Master Computer system.

In situations where there are a number of choices, as partly described above, the process of a single commuter scheduling future access to the system may become relatively complicated. As a starting point, a commuter would log in to a site managed by the overall system computer, and enter a desired travel itinerary. The commuter may wish, for example, to access the system in Santa Cruz, Calif. for a trip the next morning to Yosemite National park, with a return planned for three days hence. This interface and the operation as well, may be similar to a person making reservations for a flight to a certain destination and return (round trip).

Once the commuter has signaled the travel plans, the system ascertains the alternatives available, such as alternative PTS roadways that might be accessed and used, and congestion issues and the like. The system is pre-programmed to provide as convenient as possible future operations to maintain a high standard of safety, for example; so the system will select an itinerary, including entrance ramp locations, times of day for access, estimated arrival times, etc., and will provide the alternatives to the requesting party in order of best fit for the system and the commuter. This will be an iterated negotiation, allowing the commuter to ask questions, make selections, and provide final approval, much as one does in making flight arrangements. In some cases the location of the user's vehicle will be important, and for this purpose vehicles may be enabled for GPS, so the system may use the GPS coordinates in negotiations and plans, and to, for example, guide vehicles to entry locations, and the system can update available cells as vehicles proceed on surface roads.

Once the commuter and the system reach agreement, the system logs the newly approved plan, updates its records and expected conditions, and makes reservations at the entrance/exit facility for the commuter, these arrangements also including data regarding the vehicle to be used by the expected commuter. Of course, such plans and reservations are subject to change, and the commuter may want to change his plans at some time before execution, and in some cases the system may have to make adjustments as well, and inform the commuter that the particular plan cannot be fulfilled, and make alternative itinerary for approval.

Referring now back to FIG. 6, OBC 73 has a communication module 111 that is adapted to enable communication according to appropriate protocol with local slave computers such as at station 70 of FIG. 3 and/or with a Master computer such as computer system 95 of FIG. 5. Module 111 has all the required circuitry and uses appropriate software programs necessary for such communication. Integration with elements of a cellular telephone system may, for example be used to provide wireless communication. In this case, as briefly described above, the wireless system is preferably a wireless packet data system, which allows real-time communication between many different locations, such as is the case with a large number of PVs having OBCs together with a Master system and a number of local slave systems.

An internal bus structure 113 is provided and adapted to link all digital components and systems to CPU 105 and other required internal components. Bus structure 113 may be any type of suitable bus structure capable of relaying all communications according to appropriate protocol, and in preferred embodiments is an industry standard bus of one of several known types. There are many types of suitable bus structures known in the art and suitable for the purposes of the present invention as one with skill in the art will readily appreciate.

OBC 73 uses a plurality of input/output interface modules to enable data transfer and communication to and from various external systems and components. Each of these components is described separately below; however, several such components may be grouped to a single I/O module without departing from the spirit and scope of the present invention. The inventor chooses to isolate (one I/O to one component) various components for illustrative purposes only.

A braking system (B/S) module 115 is connected to bus 113 and provides I/O communication means from OBC 73 to a PV breaking system (not shown). A braking system for PV 15 may use hydraulic technology or other known mechanical means. In computer-controlled operation CPU, executing suitable code, operates the PV braking system, and while the PV is under control of a commuter on such as surface roadways away from the controlled roadway(s), the braking system will be under control of the commuter/driver, as in any other such independently powered and operated vehicle. Such dual control capability allows each PV to e manually controlled under certain circumstances by a commuter, and to be appropriately directed by the Master computer system while engaged with a controlled roadway.

A velocity control system (V/S) module 117 is connected to bus 113 and provides an I/O communication means from OBC 73 to a PV velocity control system. A velocity control system for PV 15 will vary in implementation depending upon the nature of the power source and drive mechanisms. Again the nature of the control is dual, either computer or manual, but never both.

A PV implemented as an EV and powered by batteries such as is illustrated herein and in FIG. 4 will use a variable power distribution system to control the amount of power to an electric drive mechanism in order to affect acceleration and deceleration. Such control systems are known in the art and therefore are not described in detail in this specification. Such velocity control may also be used for braking, precluding need for a separate braking system in some cases.

A steering-control system (S/S) module 119 is connected to bus 113 and provides an I/O communication means from OBC 73 to a PV steering control system. A steering system for PV 15 may consist of a modified power-steering mechanism that may be actuated by OBC 73 in order to affect slight adjustments in steering. Power-steering mechanisms are well known in the vehicle industry and may be suitably modified with available components to accept automated robotic control.

A coupling-system (C/S) module 121 is connected to bus 113 and provides an I/O communication means from OBC 73 to a PV coupling control system. A physical coupling system for PV 15 may be provided as described in FIG. 4. Elements of a coupling system may include an extendible engagement-member (FIG. 4., 83*a*), a coupling receptacle (FIG. 4., 83*b*), and a hydraulic system for extension and retraction (FIG. 4., 81). More detail regarding a PV coupling system such as the one described in FIG. 4 is provided later in this specification.

An electrical system (E/S) module 123 is connected to bus 113 and provides an I/O communication means from OBC 73 to various PV electrical systems (not shown). Such systems may include but are not limited to headlights, taillights, turn lights, emergency flashers, interior lights, etc. Other electrical systems may include entertainment systems such as CD-stereo components, air-conditioning/heating systems, and so on.

A proximity-sensor system (PR/S) module 125 is connected to bus 113 and provides an I/O communication means from OBC 73 to various installed proximity sensors such as sensors 35*b* of FIG. 4. In FIG. 4, proximity sensors 35*b* are illustrated as installed on the side of PV 15, and are adapted to communicate with roadway barriers or proximity modules as described in FIG. 4. However, sensors may also be provided for sensing distance between a first PV and other PVs ahead and behind. Sensors may also be provided and adapted to sense position on the roadway as related to wheel-travel surfaces and grated portions of the roadway. Input data received from various proximity sensors is used by OBC 73 to formulate required output parameters for modules 115, 117 and 119.

In some instances, some proximity data is reported to a Master system such as system 95 of FIG. 5 by local stations such as stations 87-93 of FIG. 5 while receiving collective input from individual OBCs in a control vicinity. Master system 95 may thus keep an overall picture of traffic positioning on PTS 11 and make further needed adjustments by way of command back to local stations and then to OBCs, or directly to OBCs. Proximity sensors may use radar, photo-electric, or other means, as are known in the art. There are, as well, various reporting and correction schemes possible, some of which will be described later in this specification.

Referring back to FIG. 6, a vehicle diagnostic test (VDT) module 133 is connected to bus 113 and provides an I/O communication means from OBC 73 to specially adapted test equipment and diagnostic systems of a PV diagnostic facility such as facility 55 of FIG. 3. Such equipment may test wheel alignment, external operating condition of PV systems, current capacity (charge state) of batteries, status of cooling system, and so on. OBC 73 acts as an interface between installed PV systems and such diagnostic equipment.

A passenger diagnostic test (PDT) module 131 is connected to bus 113 and provides an I/O communication means between OBC 73 and any special inquiry systems and/or automated detection equipment that may be in use at a staging location such as at facility 55. For example, automated queries concerning passenger fitness including phobias, current medications, and medical conditions, disabilities or the like may be transferred to OBC 73. OBC 73 may already have the required response information stored and may, in most instances, complete the transaction without the aid or participation of a passenger. This is especially true if the passenger is a frequent traveler on PTS 11. An automated device for checking any intoxication levels, such as a breath analyzer, may be installed as an automated detection device of PV 15. OBC 73 may communicate results through module 131. System queries and tests directed to passenger condition and status are not meant to be an intrusion; rather such conventions help to insure safety on PTS 11.

In one embodiment, a passenger will have to provide some input into a response to a medical or fitness query as described above. A passenger-interface system (PI/S) module 139 is provided and connected to bus 113. PI/S module 139 is adapted to enable a voice-to-data and data-to-voice I/O means between a passenger and OBC 73. In this way, a passenger may provide requested information not already stored on OBC 73 for use with other systems such as diagnostic systems or query systems as described above. Moreover, module 139 may be used for emergency reporting to a slave or Master system. Module 139 uses voice recognition technology known in the art.

Regardless of the communication scheme used between OBCs and a Master system, it is desired that a single master computer system such as system 95 of FIG. 5 retain a complete real-time knowledge and control over all traffic existing on PTS 11 at any given moment. Such knowledge includes current speed parameters including entrance and exit speeds, merge parameters including knowledge of available merge spacing between PVs and PV groups. Other statistics include knowledge of the number of units traveling on the system, knowledge of roadway conditions and weather factors, knowledge of ongoing maintenance and any resulting changes in system operation and performance, and so on.

Power to OBC 73 is supplied by conventional battery means as described in FIG. 4. A power cut-off (C/O) module 127 is connected to bus 113 and provides input instruction to OBC 73 to disconnect or reconnect (if disconnected) from an external power supply such as batteries. This enables OBC 73 to be serviced safely. A technician may access module 127 through a switching means (not shown) placed in a convenient location such as under the hood, or from inside PV 15.

Trip-Time Considerations

The person who drives one of the PTS vehicles on surface streets and roads, and passengers in such a vehicle, while the vehicle is on the controlled roadway accomplishing a planned and controlled trip, because, for example, the system itself is in control, may have concerns about proximity of other vehicles, spacing, acceleration, and the like. For these and other reasons the inventor provides that PTS vehicles may have windows that may be darkened, or shades that may be activated, to block the driver and passengers from outside distractions. Music may be provided, internal lighting, telephone systems, video, TV and the like, may all be provided for the driver and passengers to make the trip on the controlled roadway a pleasant experience.

It will be apparent to one with skill in the art that OBC 73 may be equipped with more or fewer modules of varying function than is illustrated in this embodiment without departing from the spirit and scope of the present invention. It will also be apparent to one with skill in the art that OBC 73 may have different functionality for interacting with different propulsion systems such as may be evident in PV vehicles using alternate power sources. There are many variable possibilities.

Referring now back to FIG. 4, PV 15 is described as having a physical coupling system adapted to enable PVs to be physically linked together successively. An exemplary coupling system for PV 15 is detailed below.

Vehicle Coupling System (VCS)

Figure 7:
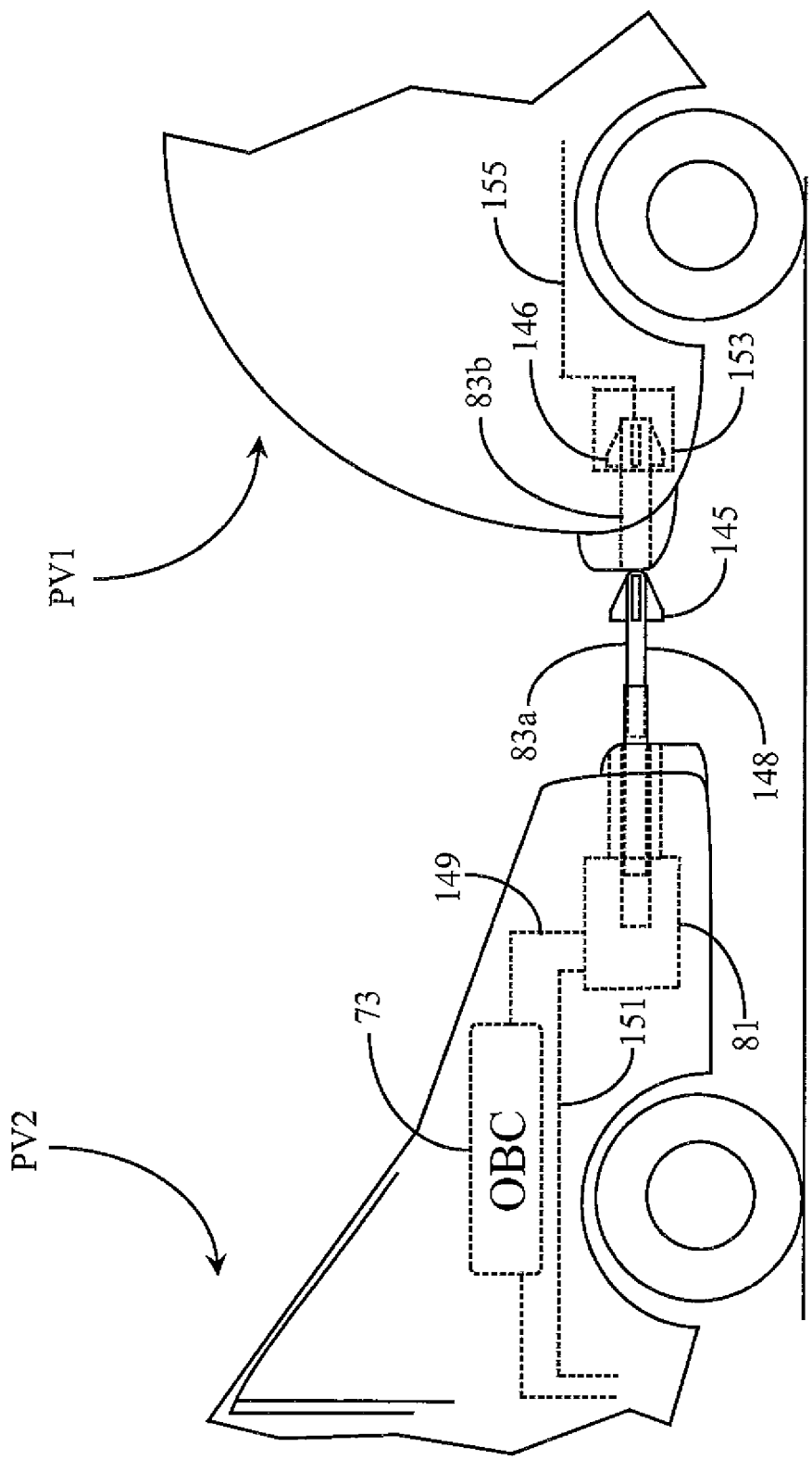
FIG. 7 is an elevation view of a vehicle coupling system (VCS) according to an embodiment of the present invention.

FIG. 7 is an elevation view of a vehicle coupling system (VCS) according to an embodiment of the present invention. An exemplary coupling system comprises an extendable member 83*a* and coupling receptacle 83*b* as previously described briefly in FIG. 4. In this embodiment, a PV2 is illustrated as presenting member 83*a* in a state of extension in preparation for coupling to a PV1 with the aid of receptacle 83*b*. In this way, a plurality of PVs may be coupled together in a line or group. Extendable member 83*a* is hydraulically operated in a preferred embodiment. However, other means of mechanical extension may also be used.

The extension apparatus comprises at least two members 83*a* and 83*b* arranged as an extensible/collapsible tube as in known in the art, which may be extended or contracted hydraulically, mechanically or pneumatically in various embodiments.

Tube 148 has a plurality of retractable coupling extensions 145 pivotally mounted to the coupling end. Extensions 145 are, in this embodiment, spring-loaded and adapted to be partially urged into the interior of tube 148 upon physical depression thereof such that their outside diameter becomes small enough to fit into the cylindrical bore of receptacle 83*b*. A mechanical means (not shown) for retracting extensions 145 against the force of loaded springs is also provided so that de-coupling may be effected.

The formation of extensions 145 at the coupling end of tube 148 assumes a conical shape so that a suitable tolerance variation with respect to the alignment of member 83*a* to receptacle 83*b* may be allowable. Member 83*a* is provided a small amount of flexibility that allows for a slight misalignment without affecting the coupling process. In this way, PVs such as PV1 and PV2 need not be perfectly aligned to each other in order to effect successful coupling. Coupling is achieved as PV2 and PV1 are traveling in collinear arrangement and suitably aligned (within allowable tolerance) to each other.

A receptacle housing 153 provides rigid support for receptacle 83*b* and retainers 146. Housing 153 may be mounted in a rigid position to the frame of a PV such that the bore of receptacle 83*b* is presented at the same height from the roadway as member 83*a*. Housing 153 may be cylindrical or rectangular in cross section with a center bore of receptacle 83*b* extending therein.

A plurality of retainers 146 are located near the rear portion of receptacle 83*b* and are adapted to accept extensions 145. Extensions 145 and associated retainers 146 are rigidly positioned to coexist in the same spatial arrangement aligned so that no rotation of member 83*a* is required during coupling. In an alternative embodiment, member 83*a* is rotatable in a clockwise or counter clockwise direction. In this alternative arrangement, extensions 145 may be brought into alignment with retainers 146 by rotation. Retainers 146 are formed in the solid mass surrounding the center bore. Spring force urges extensions 145 into retainers 146 as member 83*a* reaches a certain coupling depth into the bore of receptacle 83*b*. At this point coupling is achieved and the PVs are locked together. Member 83*a* is caused to reach a coupling depth as a combined result of the hydraulic extension of member 83*a* and any necessary deceleration or acceleration on the part of either PV 1 or PV 2 during transit.

Hydraulic pump 81 provides a means for extending member 83*a* as described in FIG. 4. A control line 149 is provided to enable OBC control of coupling. A power line 151 is provided for connecting pump 81 to a power source such as batteries 87 of FIG. 4. A sensor line 155 is provided and adapted to connect receptacle 83*b* to an OBC such as OBC 73 in PV1. A suitable sensor or sensors (not shown) is provided at the rear of receptacle 83*b* and is adapted to sense when coupling is completed and when de-coupling is completed. There are many sensing methods known in the art that are suitable for this purpose, such as switch-activated sensors, or the like.

In a preferred embodiment, coupling during motion or transit is achieved while PVs 1 and 2 are traveling at a constant speed at a specified distance from each other such that only hydraulic extension of member 83*a* need be activated to effect successful coupling. Preferably, the distance between PVs 1 and 2 after coupling is 12" or less. This aids in maximizing efficiency related to total traffic load on PTS 11, and supports a more durable coupling with respect to any side-to-side movement by any coupled PV. PVs may, of course, be coupled when one or both PVs are stationary. Furthermore, many more than two vehicles may be coupled together.

In one embodiment, a means for sharing OBC control between two or more vehicles may be achieved by coupling the vehicles. In this embodiment there are connectors at each coupling point adapted to link successive control communication lines such that one contiguous control line is created whereby control over several vehicles may be designated to one OBC system. This may be beneficial for controlling coupled groups of PVs. Similarly, one controlling OBC may designate a constant speed to several coupled PVs thus lessening load forces on each PV. Coupling may also be used in some embodiments for hauling freight in specially designed PVs adapted for the purpose. Coupling may also be used to tow disabled vehicles, or when an emergency calls for evacuation of PTS 11.

It will be apparent to one with skill in the art that many other designs and mechanical methods for coupling vehicles may be incorporated herein without departing from the spirit and scope of the present invention. The inventor intends the coupling system represented in the above embodiments to be exemplary of only one possible variant of multiple possibilities.

In another embodiment rather than coupling mechanisms, or in conjunction with a retractable coupling system, a bumper alignment system, illustrated by FIGS. 16*a* through 16*d* may be used. FIG. 16*a* is a top view of a rear bumper mechanism 416, for use on the rear of vehicles in the PTS system. Bumper 416 has an indention 417 that is has a circular shape in the horizontal plane. FIG. 16*b* illustrates a bumper mechanism 419, for use on the front or the back of at least some vehicles in the PTS system. Bumper 419 has a protruding element 420, also having a circular shape in the horizontal plane, for engaging indention 417 of bumper 416.

One object of the bumper system illustrated is to facilitate one vehicle pushing another in the case that one of the vehicles is disabled, or suffering from a power deficiency and incapable of maintaining sufficient speed to stay with the vehicle flow in the system. Another object is to keep vehicles aligned with one another. Such a bumper system keeps vehicles aligned and spaced in the event of contact whether the contact is inadvertent or intentional.

In such a case one vehicle with a front bumper 419 may engage a vehicle having a rear bumper 416, and push the forward vehicle along. The circular aspect of the protruding element and the indention is to allow the two vehicles thus engaged to navigate around corners and curves while engaged.

FIG. 16*c* is a side view of bumper 416 showing the shape of indention 417 in the vertical plane. The shape is much more narrow in the vertical plane, because angular misalignment vertically is not necessary or desirable, and the narrow aspect in the vertical helps to accomplish planar engagement of the two vehicles. The curved aspect in all planes promotes smooth engagement and disengagement.

FIG. 16*d* illustrates yet another embodiment of a bumper arrangement for alignment in case of contact, providing for a minimum of front-end projection. In this embodiment assembly 428 is for the rear of PTS vehicles, and provides a projecting element 429 that is circular at least in the horizontal plane. Element 429 may be quite similar to element 420 described above, as a flattened ovoid. Assembly 430 is for the front of a vehicle, and has a recess 431 which may provide for accepting element 429 with some clearance, rather than engagement. Engagement in this case is provided by elements 432, which in one embodiment may be polyurethane or an ultra-high-molecular-weight (UHMW) polymer. Elements 432 are curved as shown so to provide only small area contact to element 429, and may also be mounted with shock-absorbing material, which may be pneumatic, hydraulic, of elastic material. There may be similar engagement bumpers like elements 432 arranged in the vertical plane but not shown. In this embodiment there is a minimum of front-end projection for the system, or none at all. It will be apparent to the skilled artisan that there are many ways such bumper systems may be implemented, and only a few embodiments have been described herein. One requirement of such a system is that the bumpers be tapered in a manner that allows the contacting vehicles to make a maximum turn in the system without interference.

In some cases the bumper system shown may be implemented in a manner that the elements may be normally out-of-site, and may be moved into place at need.

Computer-Aided Push and Disengage

When a disabled vehicle is discovered, and the Master Computer gets involved in resolution of the problems, the Master Computer's communication with OBCs in the vehicles on the active roadway is important. Consider this scenario: A vehicle becomes disabled, and either cannot continue, or cannot maintain its position relative to the virtual spaces. The Master Computer instantly becomes aware, not only of the failing vehicle, but also of vehicles behind and in front of the failing vehicle. Through communication with the surrounding vehicles, vehicles ahead of the failing one may be diverted to exit at the next available off ramp, and the vehicle immediately behind the failing vehicle may be guided to deploy the push-bumper, if necessary, and to engage and push the failing vehicle to the next off ramp. The Master Computer and/or the On-board computer (OBC) may also control the speed of both engagement and disengagement to gently engage, and to slow the pushing vehicle at the right time, so the failing vehicle may access and clear the exit ramp, without requiring that the pushing vehicle also exit. In some cases engage and disengage may be managed without active participation of the Master Computer System. In some cases, the OBCs of two or more vehicles may cooperate to accomplish engage and disengage functions.

In a further consideration, a similar computer-aided cooperation is provided for vehicles exiting at an off ramp. In some cases the master-computer guided provision and spacing of virtual PV packets may be too close for comfort and safety one vehicle, for example, in a serial line of vehicles, to exit at an off ramp. In such a situation the master computer has prior knowledge of the schedule for the exiting vehicle, and has ample time to make adjustments to be sure the exiting vehicle has more than enough space to make a safe maneuver. Consider the following example:

One vehicle, having entered the system at a first entrance facility, is scheduled to exit at, for example, exit #9. The schedule is quite full, and the roadway system is being managed with a close spacing of virtual PV packets. Further the one vehicle scheduled to exit at exit #9 is a fifth vehicle in a string of twenty occupied PV packets, and is therefore closely following a vehicle in front, and is closely followed by a vehicle just behind.

The fact of the string of twenty occupied PV packets, making a string of twenty closely-following vehicles, means that there is at least one empty packet immediately ahead of the lead vehicle in the string of twenty, and one empty packet just behind the twentieth vehicle in the string of twenty. The master computer, as any vehicle scheduled to exit approaches its scheduled exit ramp, executes routines to ascertain all of the local conditions to that vehicle, in this case the string of twenty with spaces before and after, and selects a program to execute to provide extra space for the exiting vehicle. In this particular case the Master Computer may simply readjust the spacing in the string of twenty vehicles, to temporarily eliminate one empty PV packet ahead, or one empty PV packet behind, or both, causing the four vehicles ahead of the exiting vehicle to move ahead enough to create an empty space ahead of the exiting vehicle, and the fifteen vehicles behind the exiting vehicle to fall back enough to create space behind the exiting vehicle. After the one vehicle has safely exited, the Master Computer can cause the remaining nineteen vehicles to reform their standard spacing, updating the packet formerly occupied by the exited vehicle to now be designated in the system as empty.

Proximity Sensing System (PSS)

In a preferred embodiment of the present invention, PVs such as PV 15 of FIG. 4 navigate with the aid of a proximity sensing system. Each proximity system is a system comprising sub-systems responsible for gathering and analyzing different classes of data used to adjust separate functional systems on a PV such as steering and speed.

Referring now to FIG. 2, proximity sensors-sets 35*a* and 35*b* are illustrated and adapted to communicate in one embodiment with target modules 37*a* and 37*b* that are placed incrementally along the sides and center barrier of roadway section 13. In this embodiment, a separate reporting system linked to the roadway modules is responsible for reporting certain parameters to a master control station such as station 95 of FIG. 5. Such a reporting system may be such as local controlling computer stations 87-93 of FIG. 5. Such reports may contain parameters such as PV line location, available space parameters between separate lines of PVs, PV speed and so on. In this embodiment, sensing capability may be attributed to the roadway modules themselves with each module wired to a central module that reports to a local station. All local stations report to a master station as previously described in FIG. 5.

In another preferred embodiment the proximity sensors are of a sort that operate entirely from the PV, capable of sensing proximity and distance from proximate surfaces, such as barriers along the controlled roadway. In this embodiment no roadway-mounted modules are needed, therefore no wiring in the roadway for such modules.

The advantage of proximity sensing is that PVs may use proximity data to adjust steering, for example, to maintain lateral position in the controlled roadway. Identification and reporting of other parameters associated with PV position related to the PTS system as a whole or to other PVs, such as available space between PV lines or groups, etc. may be accomplished by each OBC in cooperation with proximity sensors. In other embodiments some functions, such as absolute position of a PV relative to the controlled roadway may be delegated to the roadway system and local control stations. Reports in this instance are created as traffic passes sets of roadway sensing and reporting modules in real time. By using this type of proximity sensing system, the speed of PVs or PV lines does not necessarily have to remain constant as continuous reporting to a master computer provides an overall view of activity on PTS 11. Commands from the master computer to individual OBCs, such as to adjust individual speeds take into account collective data related to other PVs in the vicinity such that appropriate adjustments may be effected.

In one embodiment reflectors and the like are placed incrementally and distributed along roadway 13 such that sensors 35*a* and 35*b* may. In addition to range, gauge speed and longitudinal position along PTS 11, perhaps using a photoelectric technology incorporated in addition to radar range detection technology. This will allow passing PVs to determine their own speed and absolute position along PTS 11, as well as distance between lateral barriers for automatic steering.

In one preferred embodiment the master computer maintains a distributed map of the controlled roadways and logically moves virtual spaces at a constant speed and standard spacing. The virtual spaces in this specification are termed PV packets. Each virtual PV packet has an identification number and a standard size, derived from the standard size of PVs accommodated by the system. The Master computer moves virtual packets at a constant and standard speed in the system, which, in examples in this specification is 68 miles per hour, equating to 100 feet per second. Entrance and exit ramps are also included in the virtual map to at least a point of a pre-merge constant speed-zone or safety zone. In this embodiment the Master computer marks PV packets as being occupied or not occupied at all times, enabled via continual reporting and known information. Merging traffic entering the system must attain the predetermined constant speed and merge into an unoccupied virtual space, which the Master then marks as occupied. In this way, data may be communicated to PVs waiting to enter the controlled roadway such as when to initiate movement to progress onto the system, and what ramp acceleration is required in order to place a PV in an appropriate position to merge with an assigned PV packet.

In this embodiment, sensors are still used as described in previous embodiments, but the data gathered by the sensors is chiefly used to double-check PV absolute positioning against PTS-assigned position, so appropriate adjustments may be made. For example, each entrance loop such as loops 53*a* and 53*b* of FIG. 3 has a pre-determined length, and PVs are expected to be traveling at the system constant speed in order to meet an assigned virtual ramp packet that coincides with an assigned passing packet. This section of each entrance loop is a safety zone as previously described. OBCs of PVs, using proximity sensors and position markers on ramps sense absolute position and adjust acceleration to match assigned packets to merge into the system.

In addition to proximity sensors that obtain data from side barriers for steering, a set of proximity sensors may also be provided and adapted to sense certain features in the roadway underneath the PV such as the inner edges of contact surfaces 46 of FIG. 2. Other sensors such as a front to rear sensor for maintaining a constant space between each PV may also be provided as previously described.

Figure 8:
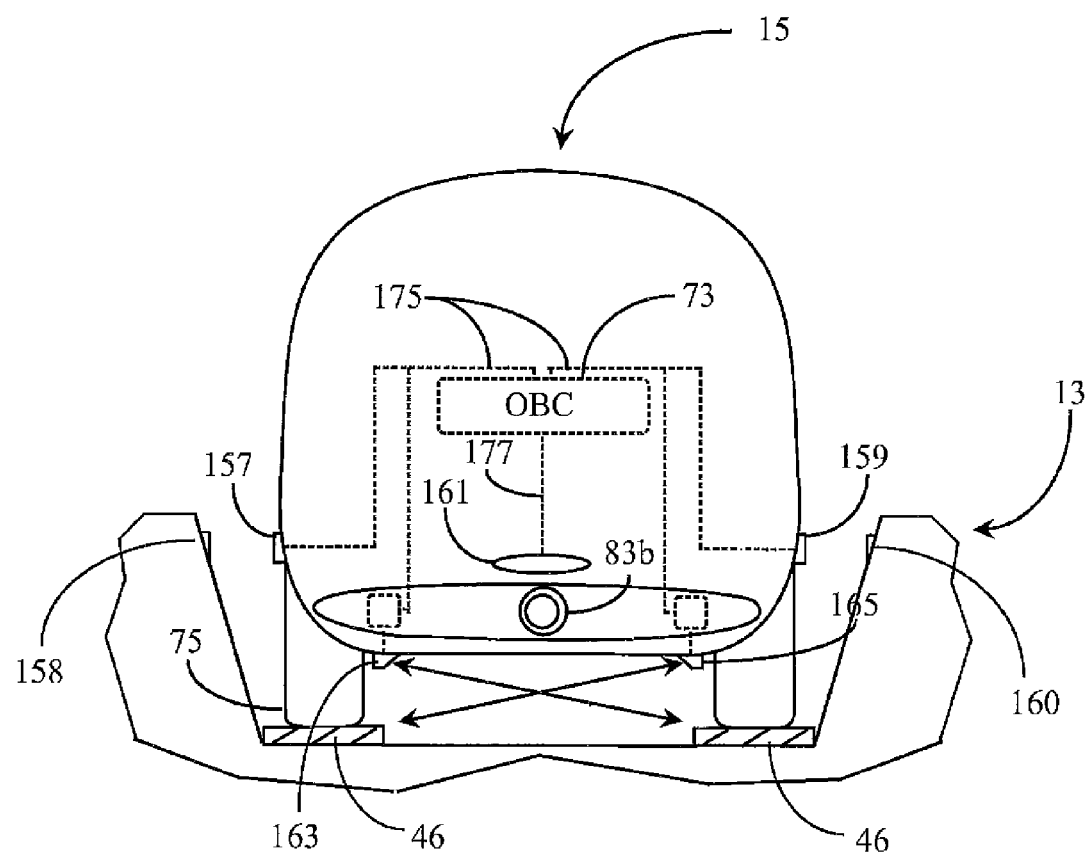
FIG. 8 is an end view of PV 15 illustrating various installed sensors and connections comprising a proximity sensing system.

FIG. 8 is an end view of PV 15 illustrating various installed sensors and connections comprising a proximity sensing system (PSS) for sensing PV proximity in a travel lane, position along PTS 11, and speed of individual PVs. PV 15 is illustrated in appropriate transit position within a travel lane that is part of controlled roadway 13. Wheels 75 of PV 15 are, in this example, positioned on raised contact surfaces 46 as described with reference to FIG. 2 above.

Proximity sensor sets 157 and 159 (two sensors each side of PV 15) are analogous to sensor sets 35*a* and 35*b* of FIG. 2. Sensors 157 and 159 are adapted to detect and sense distance from side barrier surfaces. As previously described, radar technology is used in this example, along with a photoelectric technology used to sense incremental roadway markers 158 and 160.

In this exemplary embodiment, sensor sets 157 and 159 are adapted to sense distance to each roadway barrier using radar technology. Sensor sets 157 and 159 are also adapted to sense roadway markers 158 and 159 using photoelectric technology for the purpose of determining the speed and absolute position of PV 15 along PTS 11. Therefore, sensors 157 and 159 are in effect dually-capable proximity sensors.

Data received by sensors 157 and 159 and all necessary communication between the sensors and OBC 73is by way of lines 175. By utilizing sensors 157 and 159, OBC 73 may accurately and continuously determine PV position between the barriers of roadway 13 with significant accuracy. Moreover, accurate vehicle speed and longitudinal position (absolute position in the PTS) along roadway 13 may also be determined by photoelectric interaction with roadway markers 158 and 159, which are placed periodically along barriers as previously described.

The operating system of OBC 73 causes continuous series of measurements to be accomplished using the proximity sensors on a cyclic basis, at least several times per second, such the OBC essentially has a continuous real-time knowledge of the position of the PV in the roadway relative to the side barriers. This information is used by CPU 105 (FIG. 6) to control steering through I/O module 119 to keep the PV properly centered in the roadway as the PV travels along the controlled roadway.

Additional proximity sensors 163 and 165 may in some embodiments be provided and mounted at strategic locations on the undercarriage of PV 15. Sensors 163 and 165 may be positioned as four individual sensors, two in front (one driver side and one passenger side) and two in the rear (same configuration). Sensors 163 and 165 use radar technology like sensors 157 and 159. Sensors 163 and 165 are focused on and adapted to detect the opposite existing edges (from each sensor) of raised contact surfaces 46 as illustrated by the double arrows underneath PV 15. This is possible because contact surfaces 46 are of a solid nature, raised, and not grated, as is the rest of roadway 13. In this way, additional range data may be incorporated with range data from sensors 157 and 159 in order to further reduce a margin of error. Furthermore, if an area or section of PTS 11 has no installed barriers by design, or circumstance, the undercarriage proximity system represented by sensors 163 and 165 may be used in place of sensors 157 and 159.

Two examples have been provided illustrating use of proximity sensing for automatic steering control for a PV on a controlled roadway as taught. Other systems may be used as well, such as an underneath-mounted sensor adapted to follow a powered center line in the roadway. It will be apparent to those with skill in the art that the side-to-side control system using such sensors may be implemented in a number of ways. Control lines 175 provide connection between OBC 73 and sensors 163 and 165 as previously described with side-mount sensors 157 and 159.

In an embodiment wherein several PVs may travel together in a group on a controlled roadway in close proximity, with perhaps only a foot or so between successive PVs, a method is needed to judge and maintain the spacing between each PV traveling in a group, in lieu of coupling the PVs together. Therefore, front and rear proximity sensors 161 (front sensor shown) are provided and adapted for the purpose. Radar sensors may be used in this embodiment as well. A control line 177 provides a communication connection between sensor 161 and OBC 73. Sensor 161 (rear sensor) may be mounted above coupling receptacle 83*b* as is shown here, or in any preferably centralized location on the rear surface of PV 15. Similar parameters are assumed for mounting of the front sensor.

In sensing spacing between PVs in a group and traveling on a controlled roadway at a constant speed, it is noted that the responsibility for adjusting speed is, in a preferred embodiment, a responsibility of each OBC. Automatic speed adjustment for a PV, managed by the OBC, is in response to several inputs. For example, each OBC has constantly updated data from sensors that indicate the PV absolute position in the controlled roadway at any point in time. This means the precise point at any instant along the traveled lane. The OBC also has real-time data as to the distance to the next PV ahead and the next PV behind. All of this is real-time data relating to where the PV is. Now, from the Master computer, which moves virtual packets and directs real PVs to occupy packets, the PV may know precisely where it ought to be in absolute position at any instant.

Given the above, the OBC for each PV, adjusts its own power, braking, etc. to stay within the PV packet assigned by the Master system in a safe manner. That is, a constant string of real-time data is available for the PV to know if it is, in fact, squarely within the assigned packet space, if it is gaining or falling back, and so forth. There is also data in many instances as to the relative position of PVs ahead and behind. So there may be a situation, for example, where a PV traveling along a controlled roadway, constantly checking its own absolute position and in constant communication with the Master system, knows it is 1 foot behind its assigned virtual packet space; and its forward sensor tells the OBC that there is a PV in front at a 10 inch distance. Clearly the PV cannot move up the required one foot. Conflict resolution code procedures are constantly available, so the PV may query the Master for instruction, and the Master can arbitrate correcting the position of the forward PV so the instant PV may then correct its own position.

The skilled artisan will recognize that the above example is just one example of many which may be arbitrated by the Master system between operations of individual PVs. The salient feature of the invention in this respect is that the Master system exercises Master control by moving its virtual PV packets, assigning spaces to real PVs, aiding the oncoming PVs to occupy the spaces, and then aiding the PVs to maintain their assigned spaces as long as necessary.

There are a number of ways as well that a PV may determine its absolute position on a controlled roadway. One method, described briefly above, entails side sensors of a PV recognizing fixed markers in side barriers. Such markers may be planted or mounted at increments, such as one packet length, along each controlled roadway lane, and a PV knows through sensing and communicating to the OBC the precise instant a known marker is passed. Estimates may then be forecast by the OBC and checked at each detection of a new absolute marker. Counting of markers may also be used.

It will be apparent to one with skill in the art that there are other embodiments of travel on PTS 11 that may not require some aspects of proximity sensing without departing from the spirit and scope of the present invention. For example, in one embodiment PVs may always travel in coupled groups thereby precluding the requirement for front and rear proximity sensors. In this embodiment spacing between groups (considerably more than 10 inches) would be determined and maintained by side-mounted sensors such as sensors 157 and 159. Further, one OBC in a group may be designated a control Master for the group, and exercise control over power and braking functions for other PVs in the group. In still another embodiment that was described above, some sensing responsibility is delegated to a roadway system comprising of powered modules that reports to local control stations such as station 70 of FIG. 3. There are many such possibilities.

Use of Proximity Sensors in Exit Switching

The proximity sensing system described above may also, in an embodiment of the invention, be used to effect successful switching in and out of lanes in a controlled roadway for such as exiting PTS 11 without requiring mechanical switching apparatus. A method for effecting turning by selective powering of sensors described in detail below.

Figure 9:
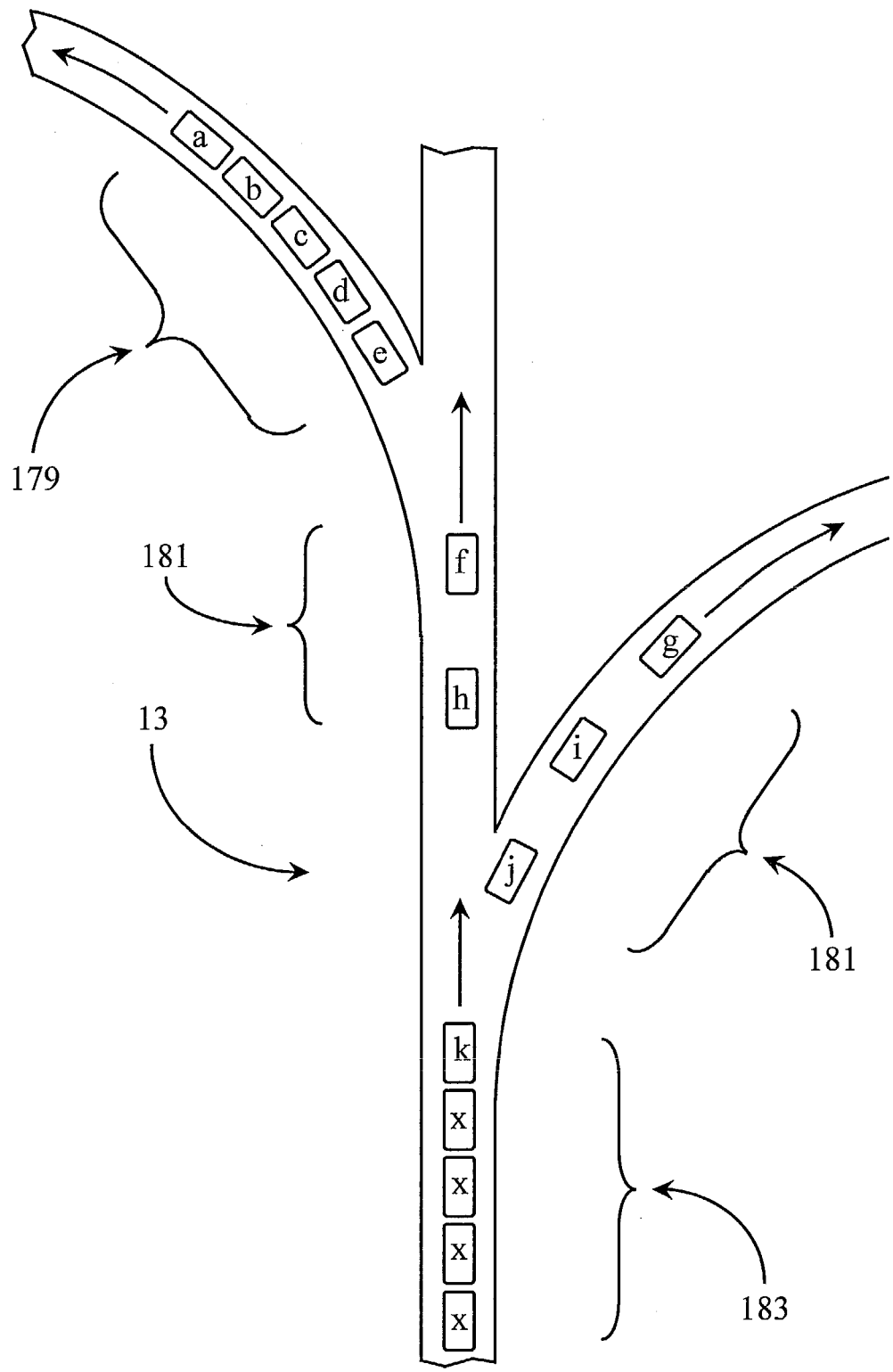
FIG. 9 is a plan view of an exemplary section of controlled roadway illustrating PV exiting capability.

FIG. 9 is a diagrammatic plan view of an exemplary section 180 of controlled roadway in an embodiment of the invention illustrating PV exiting capability by selectively following proximity sensor data. In this example, section 180 has two exit lanes 182 and 184. In the uppermost exit lane 182 there is a PV group 179 comprising individual PVs a-e progressing in unison down the exit lane. At the other exit lane 184 individual PVs g-j (indicated as group 181) is illustrated with two PVs f and h staying on main roadway 13 while PVs g, i, and j are exiting as illustrated. A group 183 of PVs comprising a lead PV k followed by four PVs labeled x is illustrated on roadway 13 just prior to reaching exit lane 184.

This unique switching system for exit lanes is enabled by the system of proximity sensing and computer steering control described above, wherein PVs are steered to maintain a central position between side barriers. Consider now PVk at the head of exit lane 184. PVk may be destined to exit at 184, to continue and exit at 182, or to continue past both these exits and leave at some exit further down the line. The exit method described herein depends on the maintenance by each OBC for each PV of an absolute position in the road way system, and the default of every PV having booked a travel itinerary. The OBC and the Master system, then, both know the absolute position of PVk as it moves and the exit ramp it is to use.

Assume for exemplary purposes that the pre-booked travel itinerary for PVk calls for exit at ramp 182. By tracking absolute position both the OBC for PVk and the Master system know exactly when PVk approaches exit ramp 184. For example, there may be bar-coded elements or other location signals, such visual indicators, radio signals and the like, at strategic locations, accessible by a side-viewing sensor, that indicate upcoming exit ramps, distance to such ramps, and actual beginning of ramps, such that the OBC of a vehicle may get timed signals to begin a process for exit, and a triggering signal to activate the steering procedure for exit. At some distance prior to the exit the OBC with approval of the Master switches to steering control by only the right-side proximity sensor(s). Now, for a short period, steering of PVk is controlled to keep PVk at a fixed distance from the right side barrier, which follows the exit ramp (the left side barrier goes straight). PVk will then be caused to follow the exit.

As absolute position data indicates PVk is wholly within the exit lane, where a left side barrier is again available to follow, the OBC, with Master approval, again enables steering to both side sensors, and PVk proceeds down exit ramp 184.

Assume now that PVk is planned by its itinerary to pass exit 184 and to take exit 182. By virtue of this pre-data and known absolute position, PVk will steer only by left side data to pass exit 184, and then continue on left-side data to take exit ramp 182, after which both-side steering will again be enabled.

In the event PVk is to pass both exits, left-side steering would be enables to pass exit 184, then right-side steering to pass exit 182, then both sides again to continue normally down the controlled roadway.

Clearly the switching of steering between proximity sensor data is necessary for every PV at and near every exit, so PVs take only the correct exits.

These rules may change, however, if there is an emergency situation and a PV must make a non-designated exit from PTS 11. The Master system may of course make such amendments as circumstances require.

PVs entering PTS 11 will follow the same protocols as those exiting, accept that an entrance ramp will have a location such as 185 and 187 for powering off the appropriate side sensors when reaching the merging point where roadway 13 is at it's widest distance across. Locations 185 and 187 may comprise strategic points having special markers in the roadway that are recognizable by individual OBCs through function of the sensors. Perhaps a simple accounting of previously described roadway markers such as markers 160 will be sufficient for OBCs to recognize when to power off or on appropriate sensors. In another embodiment, OBC's are simply commanded by a master computer such as master station 95 of FIG. 5 when to power sensors on or off. In still another embodiment the commands may come from local stations such as station 7o of FIG. 3. There are many possible variations on this command and control theme.

FIG. 18 is a plan view, the same as FIG. 9, showing two exit ramps, one to the right and one to the left, with some additional features. The sharp corner between a continuing roadway and an exit ramp can pose a danger in the case of some malfunction of sensors or guidance in exiting the main roadway to an exit ramp. For this reason exit ramps are provided in many embodiments with shock-absorbing corners 427 as shown in FIG. 18. In some embodiments the corners are made of crushable material to slow a vehicle over some distance, relieving the shock of a sudden impact. In some other embodiments hydraulic, pneumatic, or crushable components are added to provide even more shock-absorbing capability. Also in some embodiments sensors may be arrayed before one or more of the shock-absorbing corners, so the system can detect the approach of a vehicle, and take appropriate action, such as inflation of a safety device, or activation of a controlled deceleration mechanism. The activation of such a sensor also is an indication that a vehicle may be out of control, and sensors may be coupled to the Master Computer system, which may slow or stop traffic in the area. In still another embodiment there may be an area behind the sensors, between the exit ramp and the ongoing ramp, where a vehicle may be left, at least temporarily, after being stopped by the corner safety systems.

Methods for Entrance Switching

Figure 10:
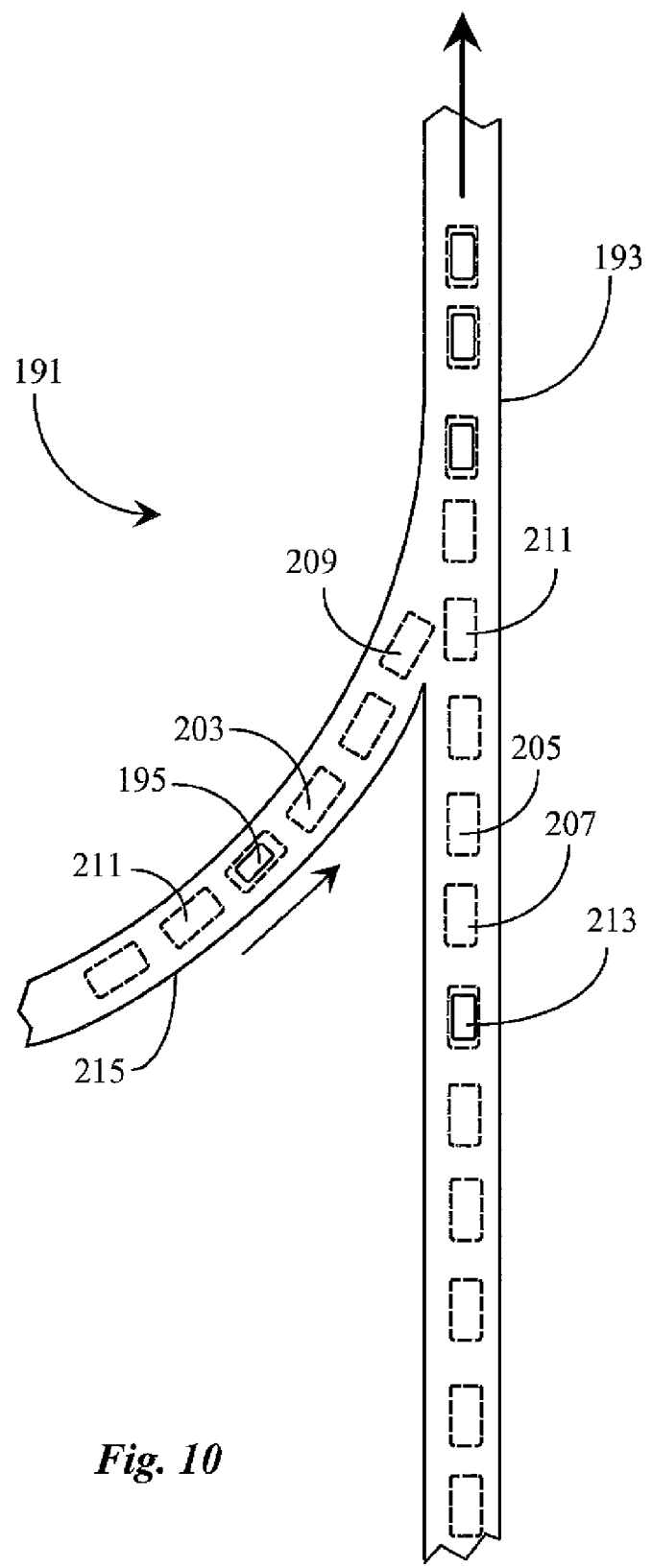
FIG. 10 is a plan view of an exemplary section of controlled roadway illustrating PV entrance capability.

FIG. 10 is a plan view of a portion 191 of PTS 11 showing an entrance ramp 215 joining into a controlled roadway lane 193, illustrating unique methods for integrating oncoming traffic into a controlled roadway. There will, of course be a number of such entrance ramps, with at least one at every interchange station associated with the PTS. In most cases each station will have at least two entrance ramps, one for each direction of travel (see FIG. 3).

As described above, in a preferred embodiment of the invention the Master computer system maintains a moving map of virtual PV packets, and marks these packets as occupied or unoccupied in real time. This real-time map of PV packets is the basis for al control and forecasting in the system. In FIG. 10 the virtual PV packets are shown as dotted rectangles. In this embodiment each packet moving in the map of controlled lanes, exclusive of entrance and exit lanes, has a primary unique identification. The specific identifier is not important to the invention, just that each packet moves at the controlled constant speed and is spaced from other packets fore and aft at the standard spacing. Examples of virtual PV packets moving in primary controlled lane 193 of the system are packets 211, 205, 207 and 213.

At entrance and exit ramps the Master system may maintain duplicate PV packets to primary packets moving on the controlled roadway primary lanes. Packets 209, 203 and 211 are examples of such packets. These packets are called duplicate packets herein because each such packet is created as an adjunct to a primary packet, and they disappear as they merge with primary packets. For example, with the primary packets moving in the controlled roadway lane 193 in the direction of the arrow, as each primary packet approaches an entrance ramp the Master system creates an adjunct packet in the entrance ramp at a position and moving in a way that the adjunct packet will merge with a primary packet at the head of the ramp, in joining with the controlled roadway.

The adjunct packets created do not necessarily always move at the controlled roadway constant default speed (100 ft/sec in these examples), but may start from zero speed and accelerate to the standard speed at the point of merging with a primary packet. The acceleration used is within the capability of an actual PV. In FIG. 10 packet 209 is adjunct to packet 211 and will disappear as it merges with primary packet 211. Packet 203 is similarly adjunct to primary packet 205, and packet 211 is adjunct to primary packet 213. Each of these adjunct packets will disappear as they merge with their respective primaries.

The creation of adjunct packets to passing primary packets is to provide a method for safely and efficiently merging actual PVs into traffic on the primary controlled roadway. Attention is drawn to the fact that packet 213 approaching on-ramp 215 is an occupied primary packet, and to merge an actual PV with this packet would be a disaster. Therefore the Master system marks adjunct packet 211 as "not to be occupied". No actual PV will be started relative to adjunct packet 211 to merge with primary packet 213.

Primary packet 207 is an unoccupied primary packet, and a PV was waiting to enter on ramp 215 at the proper time to be started relative to adjunct packet 195. Therefore the PV was started and is controlled to occupy adjunct packet 211. The OBC for the PVC occupying packet 195 operates to adjust the acceleration and speed of its PV to occupy and stay in packet 195 until packet 195 merges with packet 207 at the head of the ramp, at which time packet 195 disappears and the Master marks packet 207 as occupied. Now the OBC and Master system cooperate to maintain the PV in packet 207 until the packet and PV approach the pre-destined exit ramp.

In the merging process the PV occupying an adjunct packet is guided by the computers using the side sensors to a point in the ramp that, in this case, the right barrier ends, and then by the left barrier sensing only until fully on the primary controlled roadway, after which two-side control for steering may be re-enabled.

In the manner described above PVs at entrances and exits from the primary may be safely managed onto and off the primary roadways (see also FIG. 3). In this process there are also markers and other elements at the ramps enabling the OBCs of PVs to track their absolute position relative to the ramp and the primary roadway. The process of entering and exiting is a process of matching the absolute position with the virtual correct positions cast by the Master system, which may be copied in real time to the OBCs for control purposes.

Unauthorized Access

Disclosure was made above, referring to elements of FIG. 3, describing dealing with vehicles in need of repair, or unfit drivers. There are some other issues having to do with unauthorized vehicles. The inventor is aware that the overhead roadway and entrance ramps may pose a temptation to unauthorized users, for whatever reason. Some adventurous souls piloting vehicles that are not safely equipped to navigate the roadway, and that do not have the onboard computer systems necessary to communicate with the Master computer system, may nevertheless on rare occasions attempt to crash the system, and there may be other occasions of unauthorized vehicles attempting to access and enter the system.

Sensors, weigh stations and the like are described above for discerning whether or not a vehicle attempting to enter the system is qualified and safe. The need, however, is more than the need for identification. For example, in some cases a user, perhaps late for an event or a flight, for example, may decide wrongly that his/her vehicle is safe, even if it is not. Also, a thrill-seeker piloting a motorcycle, however, might not simply obey a request or command to exit. In that scenario, it is imperative that a system be employed to prevent the unauthorized vehicle and driver from entering the system.

FIG. 17 is a plan view of one entrance ramp 421 onto a roadway 422 of the system in an embodiment of the invention. A vehicle 423 is represented as an unauthorized vehicle attempting to drive up the entrance ramp onto the roadway. It may be assumed that the vehicle has been identified as unauthorized or unsafe by sensors and mechanisms engaged and operated prior to vehicle 423 attaining the present position shown. In a preferred embodiment the Master Computer is notified of this unauthorized attempt, and the Master Computer or OBC may thus be engaged in the solution.

In this example an auxiliary roadway, or a portion of a roadway 426 is provided, and a remotely-operable gateway formed of two moving barriers 424 and 425 may be implemented in the entrance ramp 421. Upon identification of the unauthorized vehicle 423, and at an appropriate time, barriers 424 and 435 are operated to move from their dotted-line position shown, to their solid-line position shown. This movement shunts vehicle 423 onto auxiliary roadway 426 instead of main roadway 422. After vehicle 423 is on the auxiliary roadway, the barriers swing back. In some embodiments there may be cameras as well to record each incident against possible future claims or legal action, and to substantiate illegal or unauthorized attempts at entry.

In an alternative embodiment a barrier is simply rotated, raised or dropped, that blocks the on ramp, so that vehicle 423 may not enter. This is not the preferred mode, however, because following authorized vehicle will be blocked as well until vehicle 423 is somehow removed from blocking the ramp.

In another alternative a trapdoor may be opened in the ramp to cause the unauthorized vehicle to enter a roadway below the entrance ramp, or an up-ramp may be engaged to cause the unauthorized vehicle to enter a roadway above the main roadway. In yet another alternative the system may deploy a spike bar or another sort of gate to prevent access to the roadway.

Vehicle Recovery Systems

Figure 14:
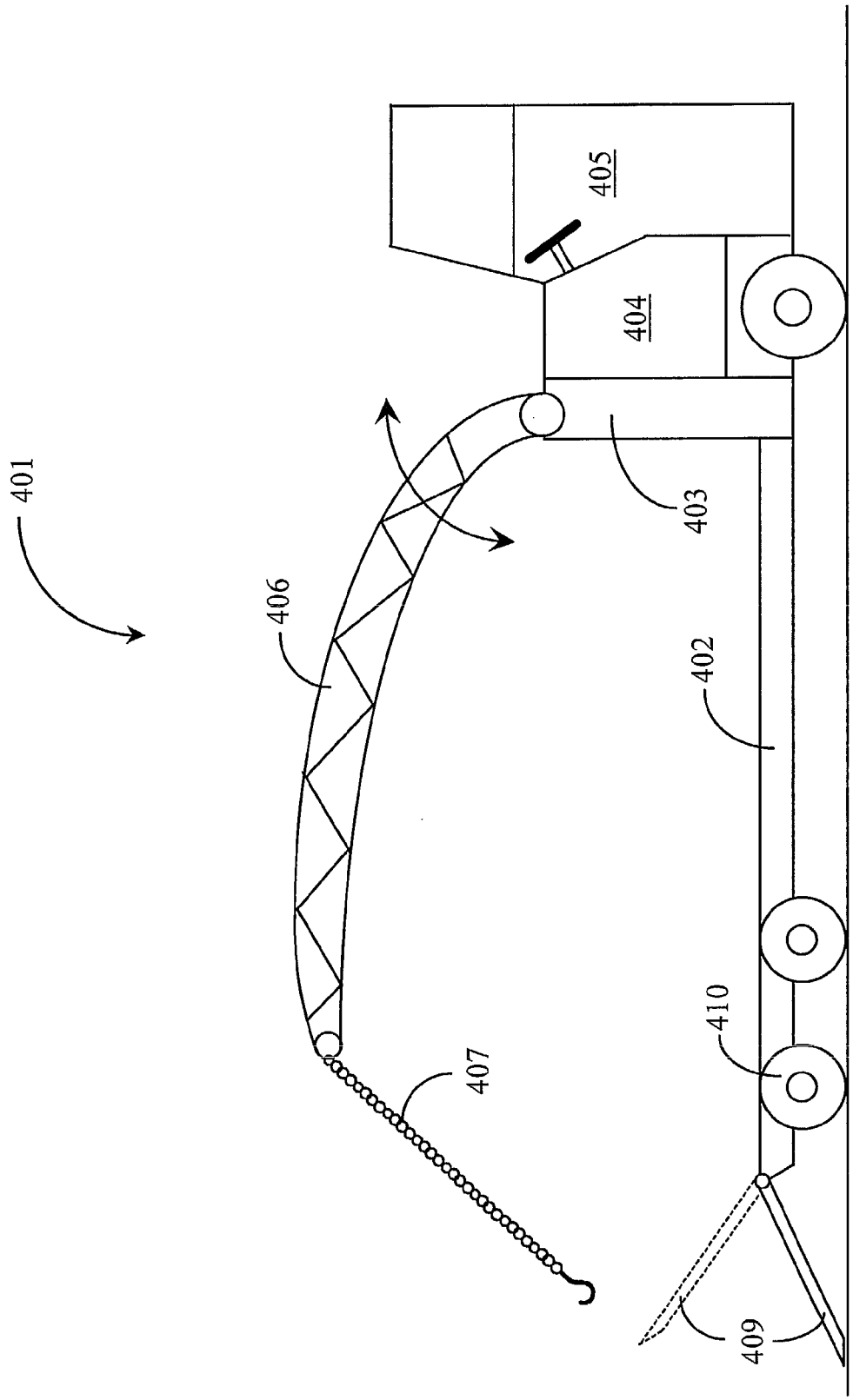
FIG. 14 is an elevation view of a mobile recovery vehicle in an embodiment of the present invention.

Regardless of care and monitoring systems there may still be rare vehicle failures or accidents that may leave a disabled vehicle on a roadway of the PTS. If this should happen there needs to be a mobile recovery vehicle (MRV) 401 such as shown in FIG. 14. MRV 401 is made to be operated on the PTS roadway, and comprises a recovery bed 402 of sufficient length to support at least one PTS vehicle that may have to be removed from the roadway. In the embodiment shown there is a support 403 for a crane 406 of 5000 pounds capacity, which may be raised and lowered as shown by a double-ended arrow, and a extendable and retractable chain 407 for engaging a disabled vehicle and pulling the vehicle onto bed 402 using a ramp 409 that may be lowered to the roadbed and raised as necessary to the position shown in dotted outline. Wheels 410 are positioned to carry expected loads with one set positioned directly under an engine compartment 404 housing in one embodiment a hydrostatic drive powered by a four-cylinder, 70 HP diesel engine. A stand-up control cab 405 is provided for an operator.

MRV 401 in one embodiment is capable of 25 MPH in either direction and one may be deployed at any convenient position to serve one or several ramps. In the case of one MRV for more than one ramp, a deployment carrier, like a flat-bed truck, may be used to move the MRV at need. In case a vehicle is disabled and a blockage occurs, the Master computer will cause the system to stop, and cause all vehicles between the disabled vehicle and the next upstream exit ramp, to exit at that ramp, clearing the roadway from the exit ramp back to the disabled vehicle. The Master computer then causes the MRV 401 to be deployed from the exit ramp back to the disabled vehicle, which it engages and removes back to the exit ramp. The system may then be brought back up to speed, with the master computer controlling the virtual spaces to accelerate gradually up to the constant operating speed.

In the embodiment described the MRV is provided with jaws of life and other needed equipment, and in many cases also with first aid equipment, although the nature of the system is such that personal injury accidents are very unlikely.

Figure 15:
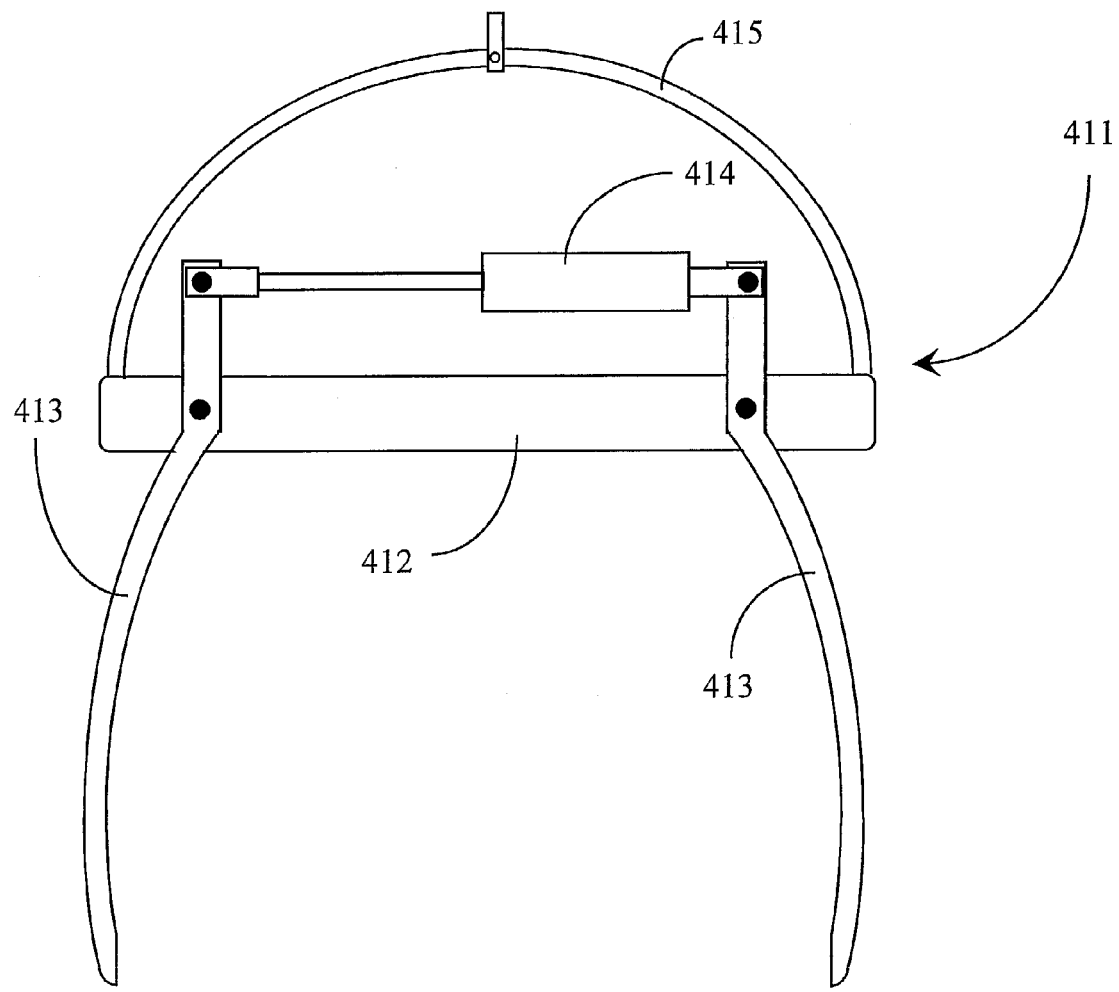
FIG. 15 is an illustration of a vehicle altering device useful with the vehicle of FIG. 14 in an embodiment of the invention.
Figure 16E:
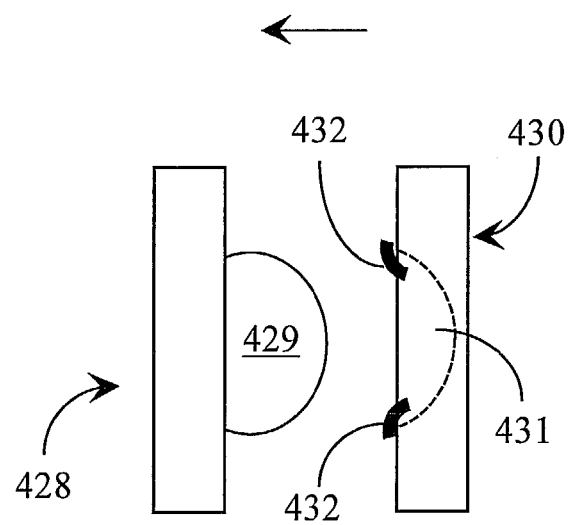

FIG. 15 is an illustration of a vehicle altering device 411, termed a "big squeeze" by the inventor, useful with the vehicle of FIG. 14 in an embodiment of the invention. Device 411 is provided to alter the shape and volume of vehicles that may have been involved in an accident, for example. In some cases a vehicle may have been rammed from behind, and altered in shape such that it may not be moveable along the roadway or onto one of the exit ramps. In such a case device 411 may be used to compact the vehicle into a smaller package that may be successfully moved along the roadway and exit ramps.

In this example device 411 comprises a frame member 412 upon which two compaction arms 413 are pivoted. A hydraulic cylinder 414 is connected across arms 413 on one side of frame 412 such that on the other side of the frame the arms may be opened and closed with force. A carrying cradle 415 is also attached to frame 412 so the device may be suspended and positioned by crane 406 of FIG. 14, for example. Hydraulic lines and control valves are not shown, but may be a part of the control equipment associated with vehicle 401 of FIG. 14.

In one embodiment the Master Computer System may be intimately involved with vehicle failures, accidents, and other perhaps unexpected happenstance on the roadway and the exits and approaches. The Master Computer, by virtue of the fact of creating, tracking and managing virtual moving spaces on the roadway system, "knows" the identity of every vehicle on the roadway, its instantaneous location and status, and is capable of forecasting "near future" positions for all such vehicles. Further the Master Computer system has a history of past operations for all client vehicles, and a real-time computerized knowledge of reserved time slots for oncoming vehicles and clients. That is, clients call ahead or web-access the system, and reserve at least approximate time slots for travel.

Given all of the "knowledge" of the system in the control of the Master Computer, in the embodiment presently being described, the Master Computer keeps a threaded log of all operations, particularly of those operations that may be occasioned by an anomaly, such as breakdown or an accident. In the event of a breakdown or an accident all operations are, of course, not automatic and computerized, but under the judgment and control of responsible people employed by a Host of the system, and responsible for certain operations. In the event of every such occurrence, the Master Computer requires that a data entry protocol be followed, so the human functions and decisions that result in return to normal operation are logged and recorded.

Now, after such a history of operations is available, in the event of a new "trouble" anywhere on the line, the Master computer system, receiving one or both of sensed information from the vehicles and the system, and trouble input from operating personnel, mines the database, and presents for the responsible parties a scenario of probable cause, and best course of action. It is a matter of patterns to some extent. In a mature system, given a deep history of activity, the Master Computer can extract from the history the closest match to the present situation, temper that with any changes that may have occurred since the previous situation (recovery vehicles may now be at different location), and present to the responsible people the best sequence of events in response to cure the problem. In some cases an exact match may be found.

Also in this embodiment the historical database may be mined on a regular or continuing basis for trends, and the statistics thus generated may be used to predict future problems, and to devise new designs and features that may be safer and more reliable for operation of the overall system.

Changing Environmental Conditions

The involvement of the Master Computer System with management of the overall system through tracking virtual spaces in the system, and in moving the virtual spaces according to pre-programmed criteria, at a constant speed, and at a fixed spacing, for example, is carefully and completely described. The inventor is aware, however, that changing environmental conditions may require alteration in the way the Master Computer manages the system.

As an example of a changing condition causing an alteration in management, a hurricane, a tornado, a seismic event or a flood, or any other natural disaster, or any human-caused problem such as an aircraft hitting the roadway, may be sensed by the Master Computer through sensors throughout the system, or may be made known to the Master Computer through human input. This knowledge, sometimes coupled with other sensory input, such as progress of vehicles in the system compared to the progress of virtual spaces, may be enough to shut down the system entirely in the case, for example, of one or more vehicles being out of phase with their respective cells. If that is the case the system is programmed to shut down in stages, so no person is left stranded on the roadway, and everyone is brought to an exit, if possible. In most cases the approach of really bad weather, for example, may be known somewhat in advance, allowing a planned and orderly shut-down of the system.

In other cases, adverse conditions may not warrant a complete shutdown, but may dictate that the size of virtual spaces be increased and the spacing between virtual spaces also be increased, allowing individual vehicles more leeway in matching and occupying a virtual space on the system. In some cases, such a strong prevailing wind in one direction, which will affect vehicles traveling in the wind direction differently than vehicles on another part of the roadway, traveling against the wind. In such a case, the Master Computer is capable of shortening spaces in some parts of the roadway, and extending spaces in another, as conditions might require. In the case of a seismic event, the initial event may not be damaging to the system, but since it is well-known that there may be other shocks, and it is also possible that a bigger event may be imminent, it is prudent that the system shut down at least temporarily, and resume when a decision is made that danger is past.

In all cases, changes made to solve a present difficulty will be always compared with actual performance, and suitable adjustments will be made.

Construction Apparatus and Methods

One object of the present invention is an ability to quickly and relatively inexpensively implement controlled roadways and to connect the resulting infrastructures to ancillary equipment to provide functioning PTS systems according to embodiments of the present invention. Some of the processes and procedures involved have been discussed briefly above with reference in particular to FIGS. 1, 2 and 3.

A feature of embodiments of the present invention that provides a distinct advantage in cost over existing and predicated systems is the fact that in most embodiments of the present invention the controlled roadway is a passive structure, designed to be modular in that sections between supports may be pre-constructed and assembled one-after-the-other, with pre-assembled structures transported over existing sections of the roadway.

Figure 11:
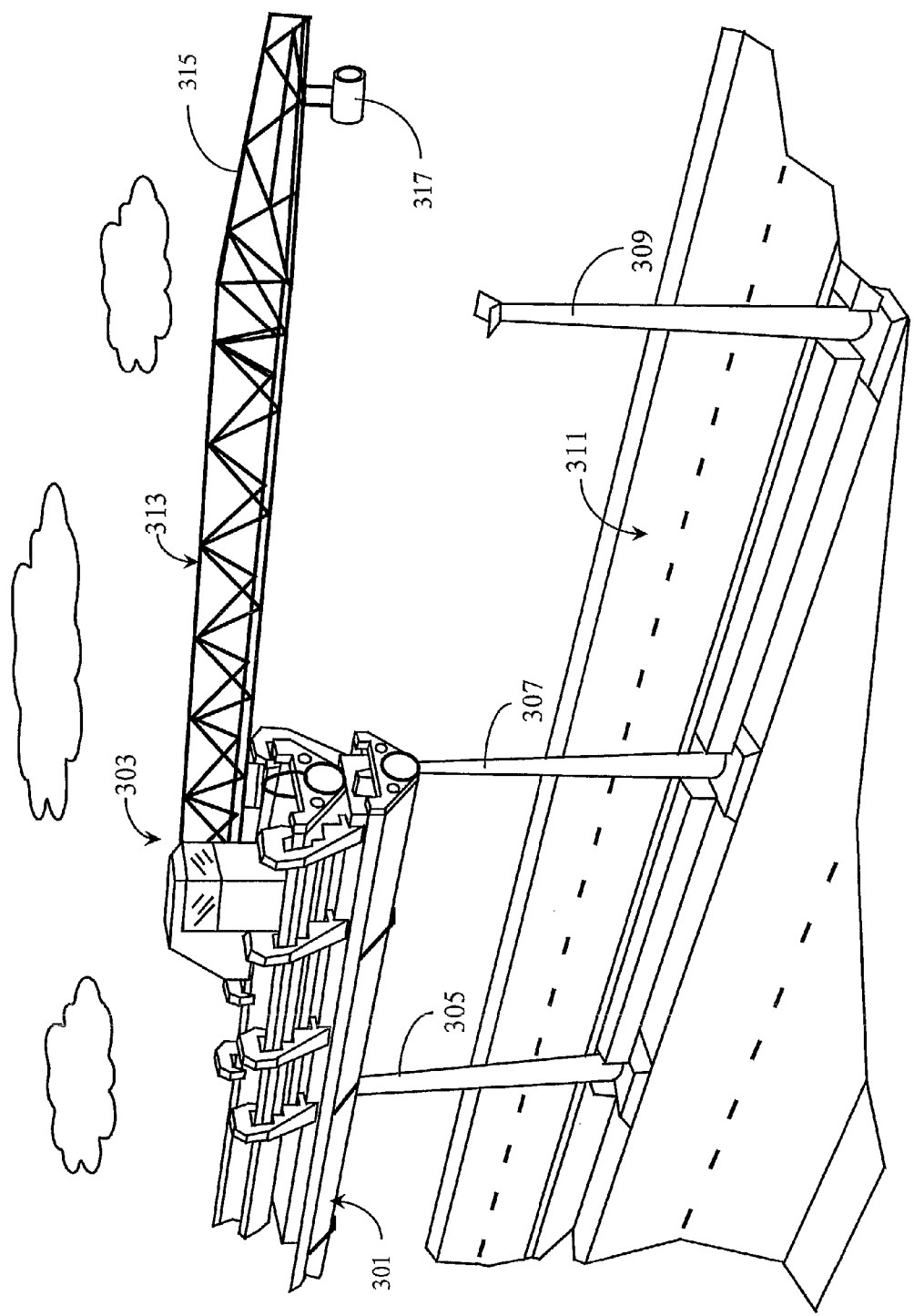
FIG. 11 is an elevation view of a portion of a partially-completed roadway illustrating a construction crane used in an embodiment of the invention.

FIG. 11 is an elevation view of a partially constructed roadway 301, and a unique construction tool in the form of a traveling crane 303 for sequentially adding new roadway sections. In this view supports for the roadway have been put in place in advance, and supports 305, 307 and 309 are shown implemented at predetermined positions. Note that the track of the supports in this case is in the median of a surface highway 311.

Roadway 301 has been extended to a point carried by support 307 in FIG. 11, and crane 303 has moved forward to the end of roadway 301 such that crane boom 313 extends beyond next support 309. Crane boom 313 is of a length to extend to a significant distance beyond next support 309, and has an articulated end 315 with a gripper mechanism 317. The articulated end is enabled to fold down and attach to next support 309.

Figure 12:
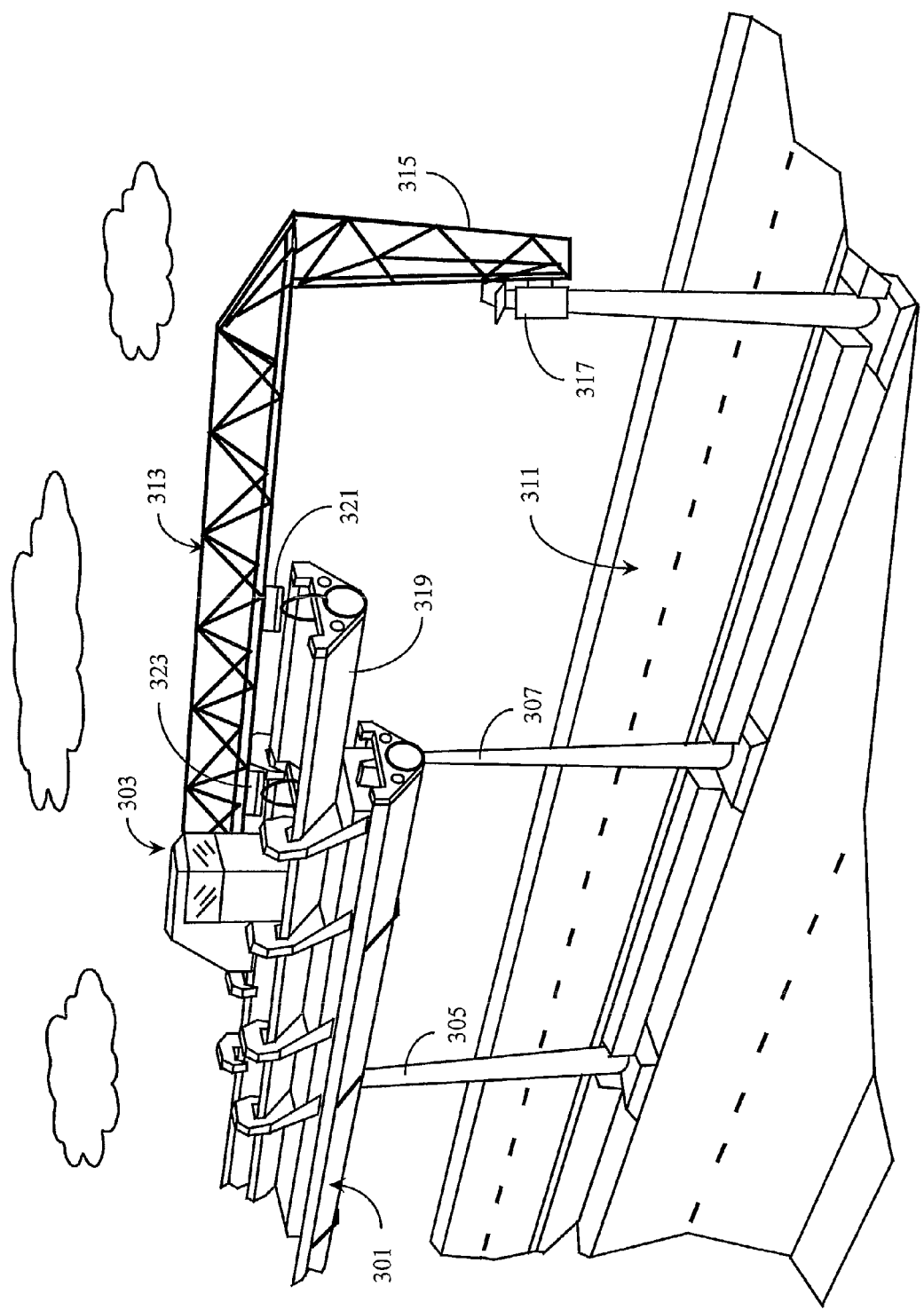
FIG. 12 is an elevation view of the crane and roadway of FIG. 11 illustrating the crane in an intermediary position of construction.

FIG. 12 illustrates crane boom 313 with articulated end 315 folded down with gripper 317 engaged with support 309, such that support 309 may now support weight of a new roadway section to be carried temporarily by crane boom 313. In this view a new roadway section 319 that has been brought forward on a suitable carrier running on the completed portion of roadway 301 has been attached to hanging supports 321 and 323 that are translatable on a track along boom 313. The crane is enabled to feed the new roadway section 319, supported by hanging supports 321 and 323, out over the span between supports 307 and 309. As this new roadway section is fed out along the boom the weight is supported by crane 303 on support 307 on one end, and by support 309, by virtue of the articulated end of the crane boom engaged now to support 309.

Figure 13:
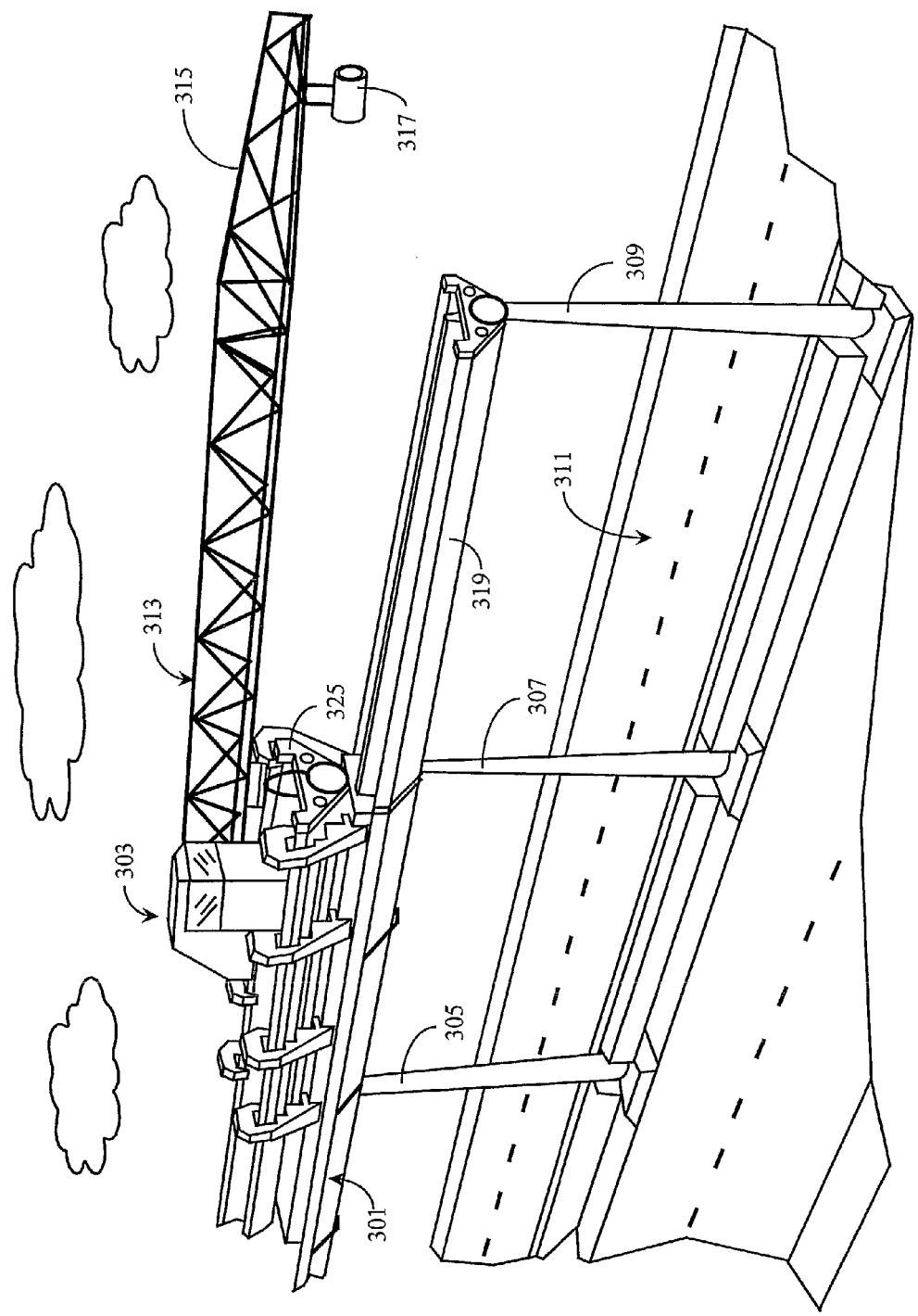
FIG. 13 is another elevation view of the crane and roadway of FIGS. 11 and 12 illustrating the crane in a further position in construction of a roadway.

FIG. 13 is a view later than the view of FIG. 12, wherein section 319 has been lowered below crane boom 313 to align with the previously completed roadway, and to suitably engage both supports 307 and 309 and be fasted in place. Gripper mechanism 317 has been disengaged from support 309, and articulated end 315 is raised up again. Now crane 303 may moved forward to a new position at the new end of the roadway (support 309), where yet another section 325 may be extended and put into place to extend the roadway further.

It will be apparent to the skilled artisan that in the example described the roadway sections need to be substantially straight. This is not, however a requirement or limitation, because curvatures for changes in direction of completed roadway may be pre-calculated and curved sections suitably manufactured and provided by suitable carriers along the completed portion of the roadway under construction, and the crane may be provided in a manner that allows curved sections of roadway to be fed out and lowered into position.

The method and apparatus just described for extending roadways in embodiments of the present invention provides a very fast and relatively inexpensive means for establishing controlled roadways between access stations in the system described herein. Manual crews may follow behind the roadway crane to add final amenities as required, so shortly after a last section is put in place a functioning roadway may be provided.

Description Summary

It will be apparent to the skilled artisan that there are a broad variety of alterations that may be made in the several embodiments of the present invention taught herein, without departing from the spirit and scope of the invention. There are for example, many ways that PVs may be provided, many ways that the controlled roadway may be implemented, and many variations in control systems and access stations in different versions within the spirit and scope of the invention. Similarly there are any alterations in software that may be used in accomplishing particular embodiments of the present invention, and many physical variations in the actual computer platforms that might be used. The invention is to be limited only by the claims which follow.

What is claimed is:

1. A personal transport system, comprising:
a master computer;
a controlled roadway comprising travel lanes and entrance and exit ramps; and
dual-mode wheeled vehicles each having an on-board computer coupled to the master computer system, the dual-mode vehicles capable of accessing the roadway via the entrance ramps, travel on the roadway, exiting the roadway via the exit ramps, and of being driven on surface streets;
wherein the master computer system divides the roadway into virtual moving packets spaced apart by a specific distance, moving at a controlled speed, and vehicles are caused to occupy individual ones of the virtual packets, and wherein the master computer may adjust virtual packet size and spacing during operation, causing vehicles occupying the space of the virtual packets to readjust position relative to one another according to the size and spacing adjustment of the packets by the master computer.

2. The system of claim 1 wherein the master computer adjusts virtual packets on a portion of the roadway ahead of an exit ramp to afford a vehicle about to exit additional space between that vehicle and proximate vehicles.

3. The system of claim 1 wherein the dual-mode vehicles comprise engagement mechanisms fore and aft, and wherein the master computer adjusts packet characteristics to cause two or more vehicles to engage one to another by the engagement mechanisms.

4. The system of claim 3 wherein the adjustment is triggered by failure of one vehicle in operation, and by the engagement an immediately following vehicle is caused to push the failed vehicle.

* * * * *